United States Patent [19]

Pavlath

[11] Patent Number: 4,735,506

[45] Date of Patent: Apr. 5, 1988

[54] PHASE NULLING OPTICAL GYROSCOPE

[75] Inventor: George A. Pavlath, Thousand Oaks, Calif.

[73] Assignee: Litton Systems, Inc., Beverly Hills, Calif.

[21] Appl. No.: 718,607

[22] Filed: Apr. 1, 1985

[51] Int. Cl.$^4$ .............................................. G01B 9/02
[52] U.S. Cl. ...................................................... 356/350
[58] Field of Search ........................................ 356/350

[56] References Cited

U.S. PATENT DOCUMENTS

| | | | |
|---|---|---|---|
| 3,102,953 | 9/1963 | Wallace | 356/350 |
| 3,395,270 | 7/1968 | Speller | 364/453 |
| 3,411,849 | 11/1968 | Aronowitz | 331/94.5 |
| 3,503,005 | 3/1970 | Mocker | 356/350 |
| 3,512,890 | 5/1970 | McLaughlin | 356/350 |
| 3,625,589 | 12/1971 | Snitzer | 350/96 |
| 3,627,422 | 12/1971 | Chodorow | 250/199 |
| 3,645,603 | 2/1972 | Smith | 350/149 |
| 3,697,887 | 10/1972 | Lee et al. | 331/94.5 |
| 3,743,969 | 7/1973 | Hutchings | 356/350 |
| 3,807,866 | 4/1974 | Zingery | 356/350 |
| 3,827,000 | 7/1974 | Matsushita et al. | 332/7.51 |
| 3,854,819 | 12/1974 | Andringa | 356/350 |
| 4,013,365 | 3/1977 | Vali et al. | 350/106 |
| 4,039,260 | 8/1977 | Redman | 356/106 |
| 4,153,331 | 5/1979 | Cross | 350/96.20 |
| 4,265,541 | 5/1981 | Leclerc et al. | 356/350 |
| 4,299,490 | 11/1981 | Cahill et al. | 356/350 |
| 4,372,685 | 2/1983 | Ulrich | 356/350 |
| 4,386,822 | 7/1983 | Bergh | 350/96.15 |
| 4,389,090 | 6/1983 | Lefevre | 350/96.29 |
| 4,410,275 | 10/1983 | Shaw et al. | 356/350 |
| 4,456,377 | 7/1984 | Shaw et al. | 356/350 |
| 4,461,574 | 7/1984 | Shaw et al. | 356/350 |
| 4,473,270 | 9/1984 | Shaw | 350/96.15 |
| 4,480,915 | 11/1984 | Arditty et al. | 356/350 |
| 4,529,312 | 7/1985 | Pavlath et al. | 356/350 |
| 4,529,313 | 7/1985 | Petermann et al. | 356/350 |
| 4,530,097 | 7/1985 | Stokes et al. | 372/6 |
| 4,549,806 | 10/1985 | Marten et al. | 356/350 |
| 4,588,296 | 5/1986 | Cahill et al. | 356/350 |
| 4,589,728 | 5/1986 | Dyott et al. | 350/96.30 |
| 4,621,925 | 11/1986 | Masuda et al. | 356/350 |
| 4,628,116 | 5/1986 | Schmadel et al. | 350/96.29 |

FOREIGN PATENT DOCUMENTS

| | | |
|---|---|---|
| 1154955 | 10/1983 | Canada . |
| 1807247 | 9/1971 | Fed. Rep. of Germany ...... 356/350 |
| 2566133 | 6/1984 | France . |
| 3104786 | 9/1982 | German Democratic Rep. . |
| 2068108 | 8/1981 | United Kingdom ............... 356/350 |
| 2152207 | 7/1985 | United Kingdom . |

OTHER PUBLICATIONS

Vali et al., "Fresnel-Fizeau Effect in a Rotating Optical Fiber Ring Interferometer", *Applied Optics*, 16, 2605, Oct. 1977.

(List continued on next page.)

Primary Examiner—Eugene R. LaRoche
Assistant Examiner—David Mis
Attorney, Agent, or Firm—Lynn & Lynn

[57] ABSTRACT

A gyroscope system includes a coherent light source that supplies counter propagating waves to a sensing loop through a pair of directional couplers. The polarizations of the waves are controlled so that they traverse identical optical paths before recombining in one of the couplers to form an interference pattern. Rotation of the sensing loop, a phase modulator and a frequency shifter cause phase changes in the counter propagating waves. A detector monitors the interference pattern of the combined waves and provides a signal to a coherent demodulator that controls the phase modulator. The output of the coherent demodulator is input to a servo-loop circuit that drives a voltage controlled oscillator. The output of the voltage controlled oscillator is an oscillatory signal having a frequency equal to the shift in frequency that the counter propagating waves experience in traversing the frequency shifter. The feedback circuitry adjusts the frequency shift to null the phase difference between the counter propagating waves. The frequency shift is linearly related to the frequency of the signal output from the voltage controlled oscillator. Each cycle of the output of the voltage controlled oscillator coresponds to a fixed angular increment of displacement of the sensing loop. The rotation rate of the sensing loop is a function of the frequency shift and the transit time of the waves through the sensing loop. The gyroscope system determines rotation rates and angular displacements over a wide dynamic range by measuring the frequency and zero crossings of the oscillatory output of the voltage controlled oscillator.

16 Claims, 9 Drawing Sheets

U.S. PATENT DOCUMENTS

Moss et al., "Phonton-Noise Limited Transducer for Gravitational Antenna:, *Applied Optics,* 10, 2495, 1971.

Davis, J. L. and Ezekiel, S., "Techniques for Shot-Noise-Limited Inertial Rotation Measurement Using a Multiturn Fiber Square Interferometer", SPIE, vol. 157, Laser Inertial Rotation Sensors (1978), p. 131.

Fujii, "Optical Fibers with Very Fine Layered Dielectrics", *App. Optics,* vol. 25, No. 7, Apr. 1, 1986, pp. 1061-1065.

Vali et al., "Ring Interferometer 950 m Long", *Applied Optics,* vol. 16, No. 2, Feb. 1977, pp. 290-291.

Lamouroux et al., "Polarization Effect in Optical-Fiber Ring Resonators", *Optics Letters,* 1982, vol. 7, No. 8, pp. 391-393.

Cahill et al., "Phase-Nulling Fiber-Optic Laser Gyro", *Optics Letters,* 1979, vol. 4, No. 3, pp. 93-95.

Cumming, "The Serrodyne Frequency Translator", *Proceedings of the IRE,* Feb. 1957, pp. 175-186.

Goss, "Fiber Optic Rotation Sensor (FORS) Signal Detection and Processing", *SPIE,* vol. 139 (1978).

Kinter, E. C., "Polarization Problems in Optical Fiber Gyroscopes", *Applied Optics,* vol. 18, No. 9, pp. 78-81.

LeFevre et al., "Progress in Optical Fiber Gyroscopes Using Integrated Optics".

Ulrich, R., "Polarization Stabilization on Single-Mode Fiber", *Appl. Phys. Lett.,* 35(11), 12/01/79.

Pavlath et al., "Fiber Optic Gyroscopes: Advances and Future Developments, *Navigation: Journal of the Institute of Navigation,* vol. 31, No. 2, Summer 1984, pp. 70-83.

Mohr, F. A. and Scholz, U., "Polarization Control for an Optical Fiber Gyroscope", *Fiber Optic Rotation and Related Technology,* Springer Verlag, 1982, pp. 163-168.

Willson et al., "Magnetostrictive Fiber-Optic Sensor System for Detecting DC Magnetic Fields", *Optics Letters,* Jun. 1983, vol. 8, No. 6, pp. 333-335.

Risk et al., "Single-Sideband Frequency Shifting in Birefringent Optical Fiber", *SPIE,* vol. 478, Fiber Optic and Laser Sensors 2(1984), pp. 91-97.

Campbell et al., "Rotating-Waveplate Optical-Frequency Shifting in Lithium Niobate", *IEEE Journal of Quantum Electronics,* vol. QE-7, No. 9, Sep. 1971, pp. 450-457.

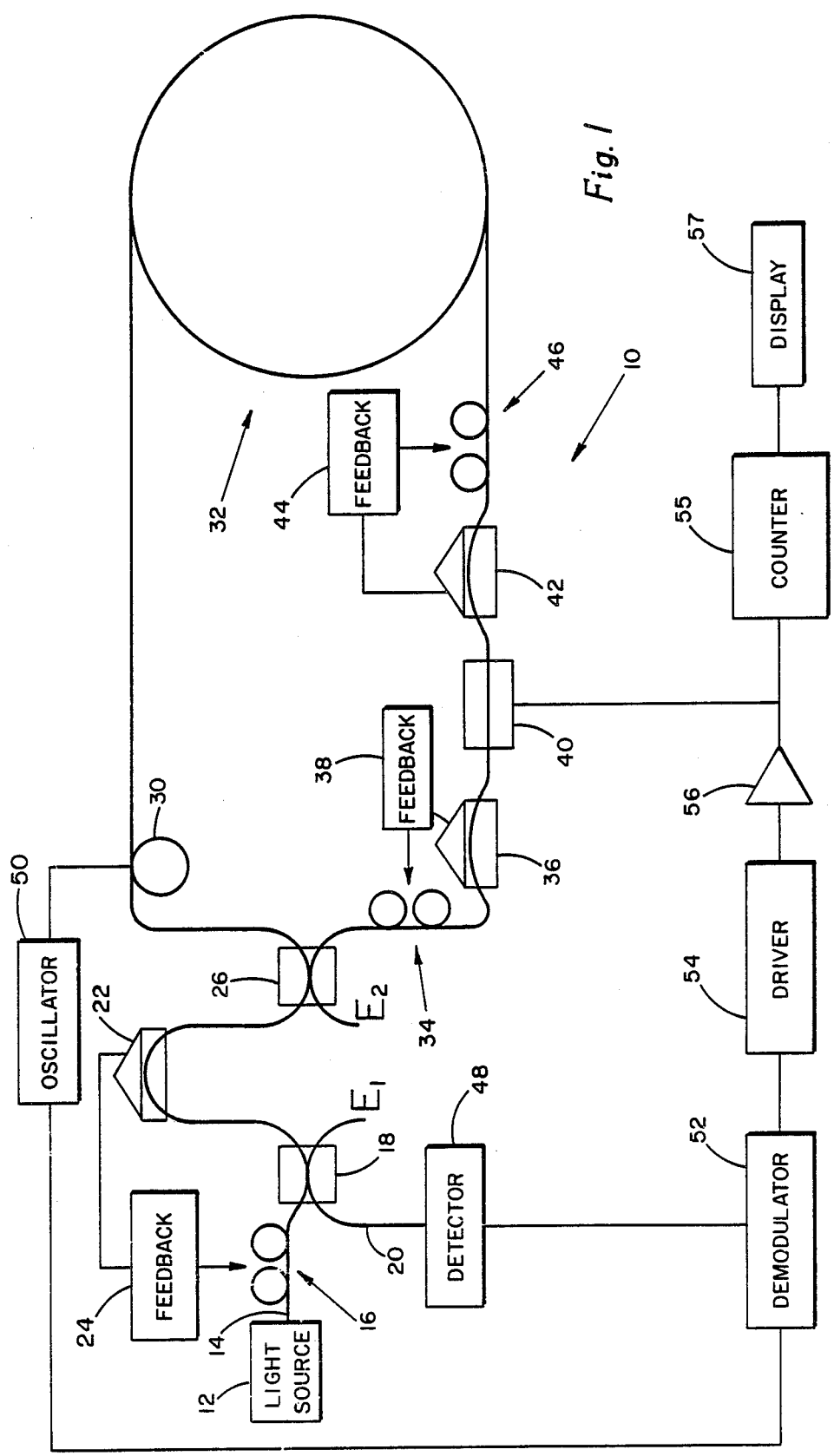

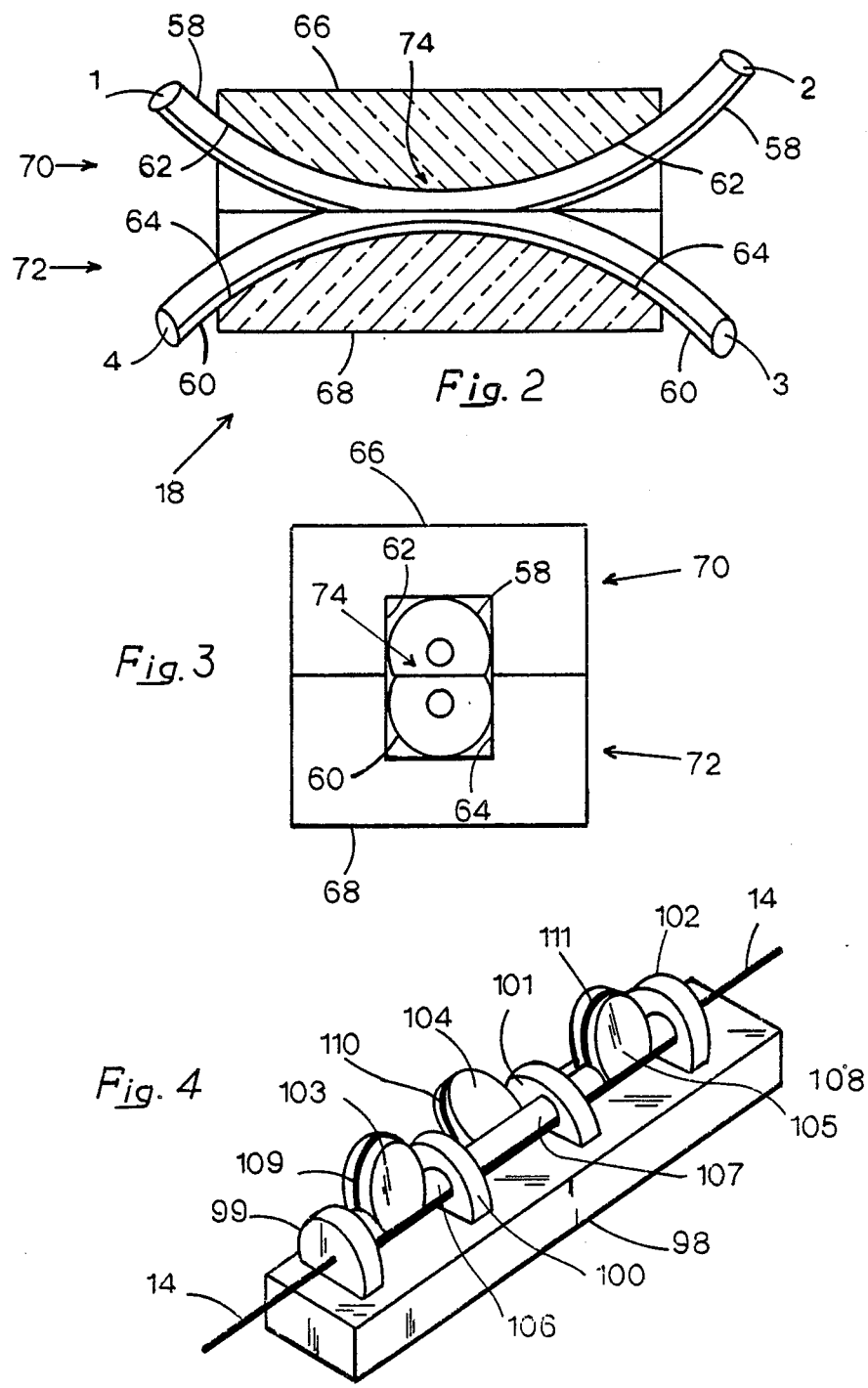

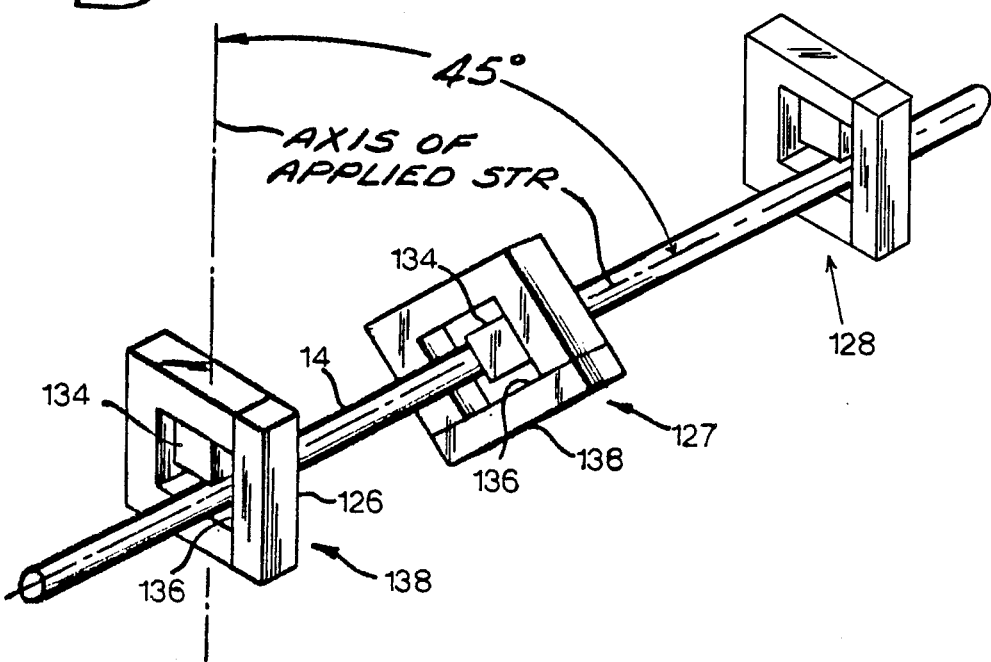
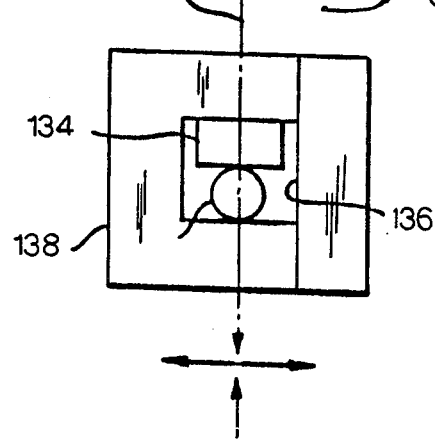

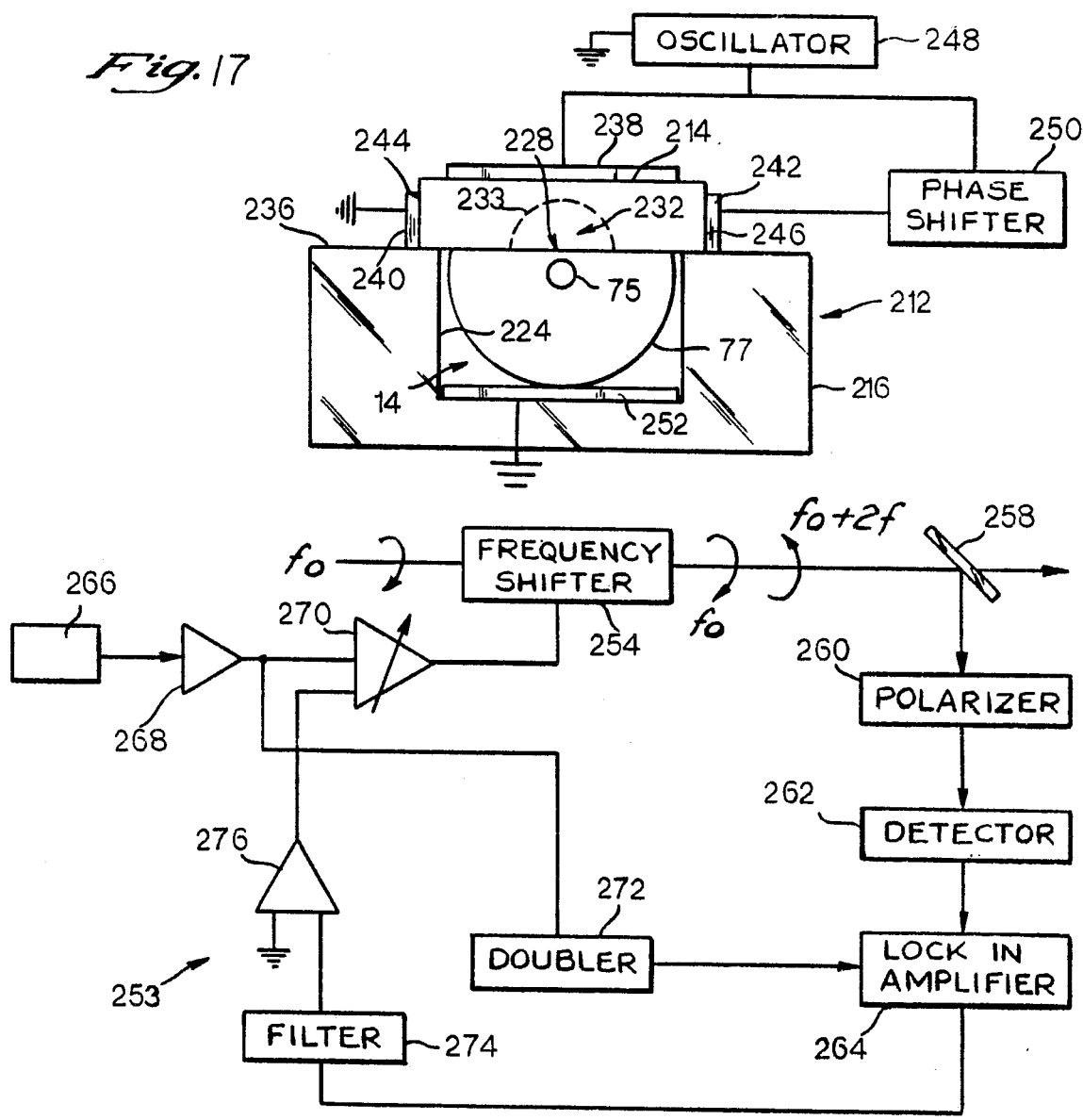
Fig. 17
Fig. 18
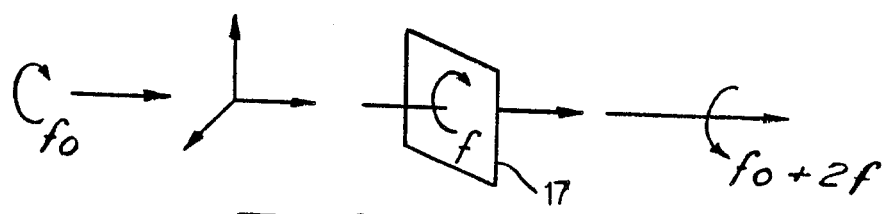
Fig. 12

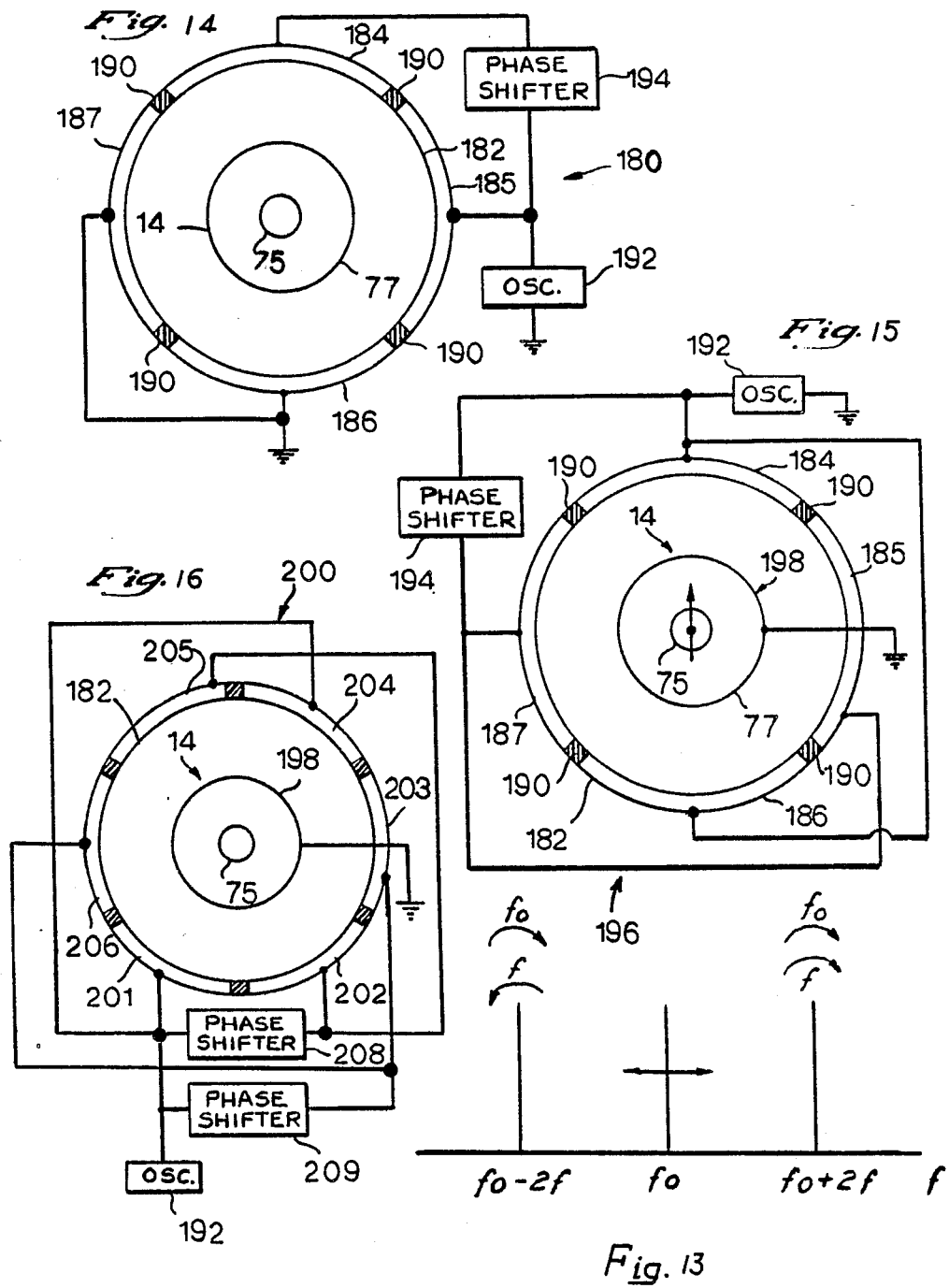

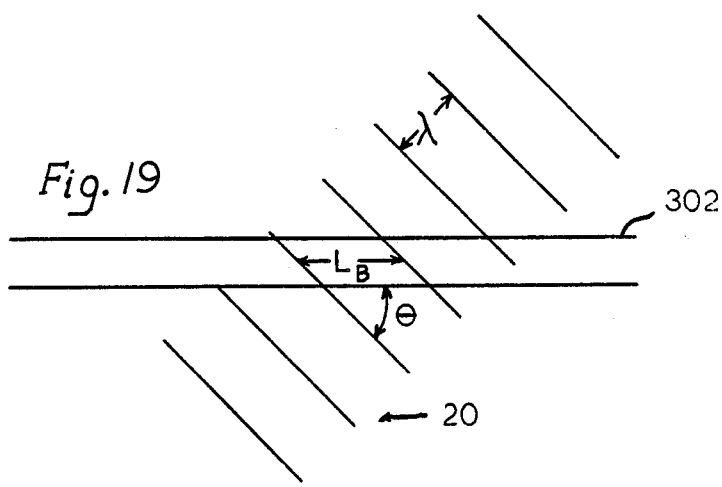
Fig. 19
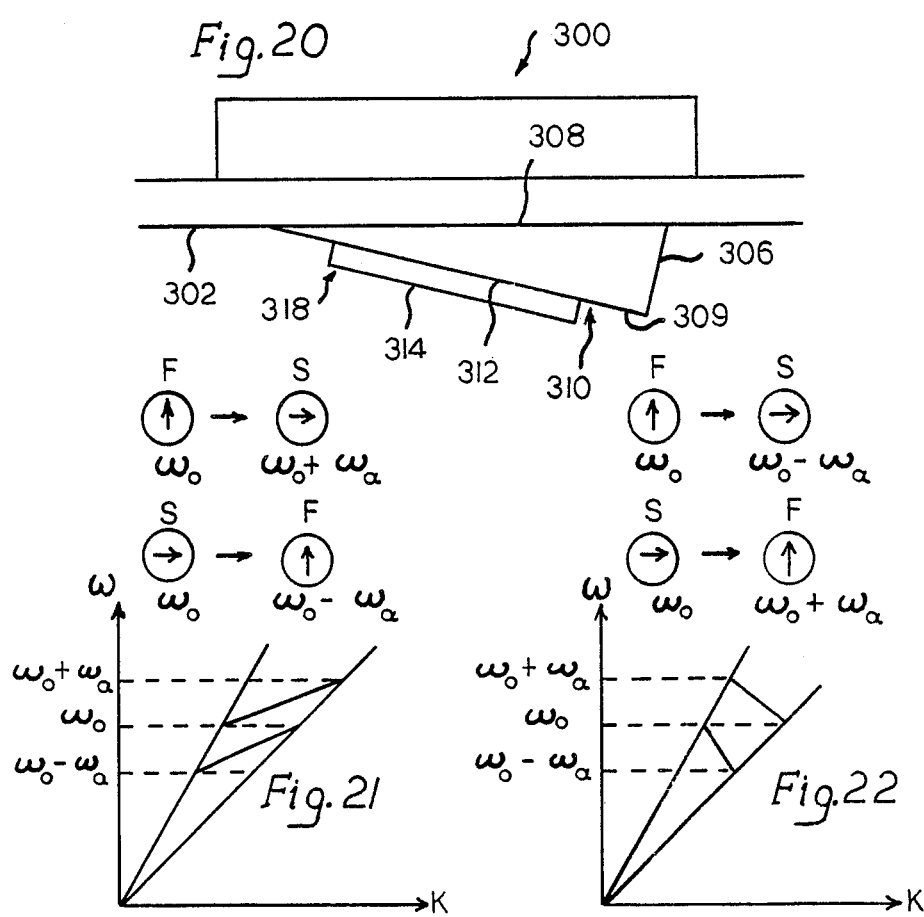
Fig. 20
Fig. 21
Fig. 22

PHASE NULLING OPTICAL GYROSCOPE

BACKGROUND OF THE INVENTION

This invention relates generally to rotation sensors and particularly to fiber optic rotation sensors. Still more particularly, this invention relates to a fiber optic rotation sensing system suitable for aircraft navigation using differential frequency propagation to compensate for the Sagnac phase shift in a rotating fiber optic loop to measure the rotation rate and angular displacement.

A fiber optic ring interferometer typically comprises a loop of fiber optic material having counter-propagating light waves therein. After traversing the loop, the counter-propagating waves are combined so that they constructively or destructively interfere to form an optical output signal. The intensity of the optical output signal varies as a function of the type and amount of interference, which is dependent upon the relative phase of the counter-propagating waves.

Fiber optic ring interferometers have proven to be particularly useful for rotation sensing. Rotation of the loop creates relative phase difference between the counter-propagating waves, in accordance with the well known Sagnac effect, with the amount of phase difference being a function of the angular velocity of the loop. The optical output signal produced by the interference of the counter-propagating waves varies in intensity as a function of the rotation rate of the loop. Rotation sensing is accomplished by detecting the optical output signal and processing the optical output signal to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper limit lower limits to be measured is approximately $10^9$.

The output of an open loop fiber optic gyroscope is a sinusoidal waveform having a phase shift relative to a reference for indicating a detected rate of rotation. The sinusoid is nonlinear and not single valued, which present difficulties in obtaining accurate measurements. The amplitude also fluctuates because it is dependent upon several parameters that may fluctuate.

All fiber gyroscopes having low bias levels and high sensitivity to rotations have been constructed. However, the dynamic ranges of previous all fiber gyroscopes are very limited and their outputs are nonlinear with respect to rotation rate.

SUMMARY OF THE INVENTION

The present invention provides an all fiber optic gyroscope that overcomes the deficiencies of previous all fiber optic gyroscopes for use in such applications as aircraft navigation systems. The present invention includes a loop of fiber optic material having two equal magnitude counter-propagating light waves therein. The light waves input to the sensing loop have predetermined polarization, and the polarization of the waves is controlled in the loop. The sensing loop includes a frequency shifter and a phase modulator. A servo control circuit receives output signals from the sensor loop and from an oscillator that controls the phase modulator. The servo control loop controls the frequency shifter to null the output of the sensing loop. The frequency of the feedback signal used to control the amount of phase shift is linearly proportional to the rotation rate of the sensing coil. Each cycle of the feedback control signal corresponds to a fixed angular increment of rotation of the sensing coil so that counting the number of cycles of the feedback control signal permits direct measurement of the amount of rotation.

BRIEF DESCRIPTION OF THE DRAWINGS

FIG. 1 is a schematic representation of a closed loop, all fiber optic gyroscope according to the invention including a sensor loop and apparatus for processing the output of the sensor loop to determine the angular rotation rate and displacement of the loop;

FIG. 2 is a schematic representation of a fiber optic directional coupler that may be included in the fiber optic gyroscope of FIG. 1;

FIG. 3 is a cross sectional view about line 3—3 of FIG. 2;

FIG. 4 schematically illustrates a polarization controller that may be included in the fiber optic gyroscope of FIG. 1;

FIG. 5 is a perspective view of a second polarization controller that may be included in the fiber optic gyroscope of FIG. 1;

FIG. 6 is a crossection of a portion of the polarization controller of FIG. 5;

FIG. 12 schematically illustrates frequency shifting of a light wave using a rotating half-wave plate;

FIG. 13 graphically illustrates possible frequency shifts using a rotating half wave plate;

FIG. 14 illustrates a frequency shifter that may be included in the fiber optic gyroscope of FIG. 1;

FIG. 15 schematically represents a second fiber optic frequency shifter that may be included in the fiber optic gyroscope of FIG. 1;

FIG. 16 schematically illustrates a third frequency shifter that may be included in the fiber optic gyroscope of FIG. 1;

FIG. 17 schematically illustrates a fourth fiber optic frequency shifter that may be included in the fiber optic gyroscope of FIG. 1;

FIG. 18 is a block diagram of circuitry used to control the frequency output of the frequency shifters of FIGS. 15-18;

FIG. 19 illustrates an acoustic waave incident upon an optical fiber;

FIG. 20 illustrates a bulk wave frequency shifter that may be included in the fiber optic gyroscope of FIG. 1;

FIG. 21 is a graphical representation of frequency and wave number relationships for light propagating in the frequency shifter of FIG. 20 in the same direction as an acoustic wave;

FIG. 22 is a graphical representation of frequency and wave number relationships for light propagating in the frequency shifter of FIG. 20 in the opposite direction as an acoustic wave.

DESCRIPTION OF THE PREFERRED EMBODIMENT

Figure 7:
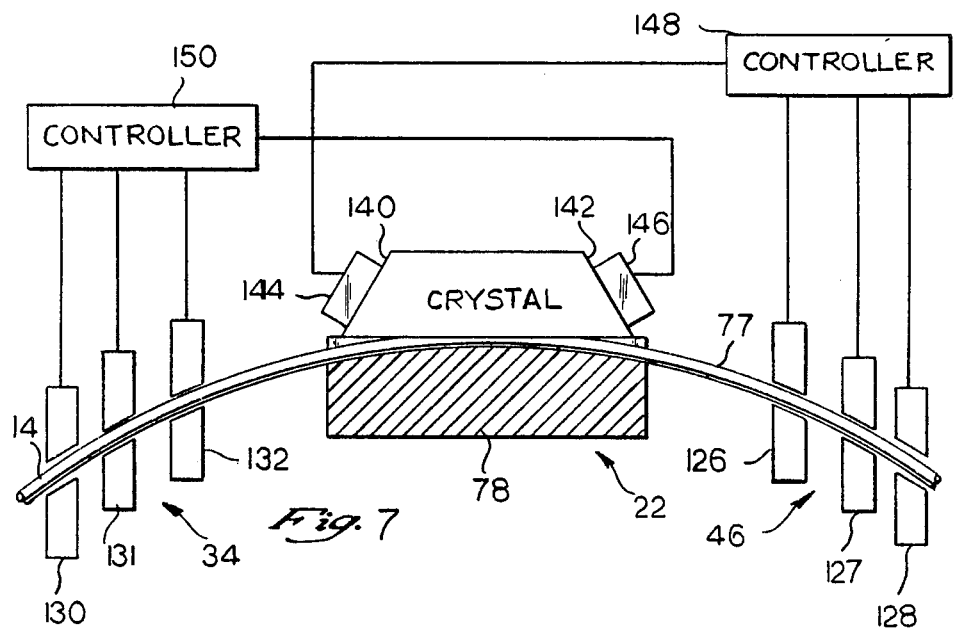
FIG. 7 is a schematic representation of a polarization control system that may be included in the fiber optic gyroscope of FIG. 1.

Referring to FIG. 1, a closed loop fiber optic gyroscope system 10 according to the invention includes a low coherence light source 12, which outputs a beam of low coherent light that is input to a fiber 14. Light propagates through the fiber 14 to port 1 of a polarization controller 16, which outputs light at port 2 of a predetermined polarization into a fiber optic directional coupler 18. The coupler 18 typically has a coupling coefficient of 50% so that half of the light input thereto couples into a second fiber 20 and is then lost from the gyroscope system 10 as indicated at $E_1$.

The remainder of the light input to the directional coupler 18 propagates to port 2 of the directional coupler 18 and is then input to a linear polarizer 22. The linear polarizer 22 is normally selected to allow a desired linear polarization to propagate within the fiber 14 while coupling light of undesired polarizations out of the fiber 14 Light of undesired polarizations coupled out of the fiber 14 represents a loss of signal intensity. Therefore, the polarizer 22 preferably includes an electronic feedback circuit 24 that produces an error signal indicative of the intensity of the undesired polarizations. The error signal is input to the polarization controller 16 as a negative feedback signal to adjust the polarization controller 16 so that light input to the polarizer 22 essentially has only the desired polarization.

The signal of the selected polarization then propagates from the polarizer 22 to port 1 of a second directional coupler 26, which preferably has a coupling efficiency of 50% in order to produce counter propagating signals having equal intensities in the fiber 14. Light propagating straight through the coupler 26 and output at port 2 is hereinafter referred to as the clockwise wave. The clockwise wave encounters a phase modulator 30 before traversing a sensing coil 32 in the fiber 14.

Light cross coupled in the fiber optic coupler 26 and output at port 4 is referred to as the counterclockwise wave. The counterclockwise wave is incident upon a second polarization controller 34. Light passing from the polarization controller 34 enters a linear polarizer 36 that allows only light of a selected linear polarization to remain within the fiber 14. Undesired polarization components in the counterclockwise wave are coupled from the fiber 14. A feedback circuit 38 processes the undesired polarization intensity to produce an error signal that is input to the polarization controller 34 as a negative feedback signal to minimize the intensity of the undesired polarization.

Light of the selected polarization propagates from the polarizer 36 to a frequency shifter 40, which has an output that is input to a linear polarizer 42, which like the polarizer 36 is adjusted to allow only light of a second selected polarization to propagate within the fiber 14. The linear polarizer 36 is set to launch light into the frequency shifter 40 of the desired polarization. The output of the frequency shifter 40 supplied to the linear polarizer 42 has a polarization that is orthogonal to the output of the linear polarizer 36. The polarizer 42 is set to pass this input with no loss. The counterclockwise wave output from the polarizer 42 propagates through a polarization controller 46 and then traverses the sensing loop 32 and then continues to propagate in the fiber 14 to the phase modulator 30. After passing through the phase modulator 30, the cross coupled signal then is incident upon port 2 of the directional coupler 26.

The clockwise wave traverses the loop 32 in a direction opposite that of the counterclockwise wave. After traversing the sensing coil 32, the clockwise wave propagates through the polarization controller 46 to the polarizer 42. An electronic feedback circuit 44 processes the intensity of light of the undesired polarizations in the clockwise wave to produce a negative feedback signal that is input to the polarization controller 46. The portion of the clockwise wave having the desired linear polarization propagates in the fiber 14 to the frequency shifter 40, the polarizer 36, and the polarization controller 34 before propagating to port 4 for input to the directional coupler 26. The clockwise wave output of the frequency shifter 40 has the polarization which the polarizer 36 is set to propagate so that the polarizer 36 has no effect on the clockwise wave.

Half of the signal input to port 4 of the directional coupler 26 propagates straight through to be output at port 3 and is coherently combined with half of the input to port 2, which cross couples to port 3. Half of the signal input to the directional coupler 26 at port 4 cross couples to port 1 and is combined with the portion of the signal that propagated straight through the coupler 26 from port 2 to port 1. The combined waves interfere and produce an interference pattern.

The recombined waves exit the coupler 26 at port 1 and propagate to the linear polarizer 22, which eliminates the undesired polarization from the recombined waves. Portions of the recombined waves of the desired polarization propagate from the linear polarizer 22 to the directional coupler 18 where half of the recombined signals couple from port 2 of the directional coupler 18 to port 3 and are then incident upon a detector 48.

An oscillator 50 supplies signals to the phase modulator 30 and to a coherent demodulator 52 which also receives signal from the detector 48 that is indicative of the Sagnac phase shift of the clockwise and counterclockwise waves. The output of the coherent demodulator 52 is input to a servo loop electronic circuit 54 that drives a voltage controlled oscillator 56. A portion of the output of the voltage controlled oscillator 56 is input to the frequency shifter 40. The remainder of the output of the voltage controlled oscillator 56 forms the signal output of the optical gyroscope system 10 and is indicative of the rate of rotation of the sensing loop 32 and the angular displacement thereof.

An up-down counter 55, which is preferably a dual channel counter, receives the signal output from the voltage controlled oscillator 56. By counting the zero crossings of the signal, the up-down counter 55 produces a signal that is indicative of the rotation rate. The rotation rate may be displayed upon any suitable display device 57.

Figure 23:
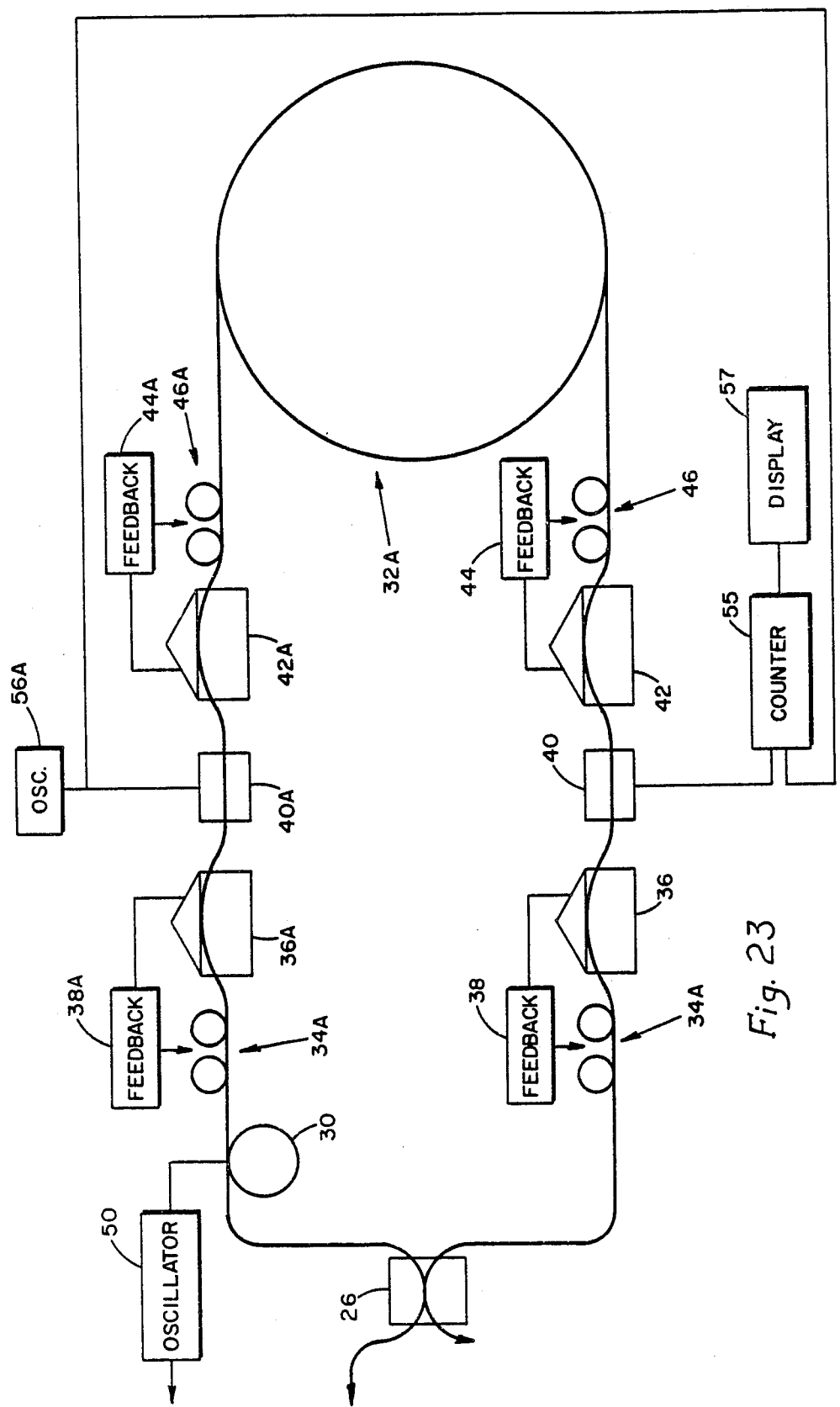
FIG. 23 illustrates a second sensor loop that may be included in the fiber optic gyroscope of FIG. 1.

Referring to FIG. 23, the fiber optic rotation sensor 10 may include a sensor loop 32A that includes a lower branch substantially identical to that shown in FIG. 1 and an upper branch that includes fiber optic components substantially identical to those of the lower branch. The corresponding components of the upper and lower branches perform identical functions.

Light input to the upper branch from the coupler 26 propagates from the phase modulator 30 to a polarization controller 34A and then to a polarizer 36A, which includes a feedback circuit 38A similar to the feedback circuit 38. Light of a desired polarization remains in the fiber 14, and light of the undesired polarization is processed by the feedback circuit 38A to adjust the polarization controller 34A to produce an input to the polarizer 38A that results in maximizing the intensity of the desired polarization and substantially elimnating the undesired polarization component from the optical signal propagated by the fiber 14.

After exiting the polarizer 36A, the signal propagates to a frequency shifter 40A, which is substantially identical to the frequency shifter 40. An oscillator 56A controls the amount by which the frequency shifter 40A shifts the frequency of optical signals propagating therethrough. After experiencing a frequency shift, the signal propagates to a polarizer 42A and then to a polarization controller 46A. A feedback circuit 44A is connected between the polarizer 42A and the polarization controller 46A.

The structure and method of operation of the fiber optic components of the gyroscope system 10 will be explained before explaining the method of operation of the complete gyroscope system 10 to measure rotation rates and angular displacements.

FIBER OPTIC DIRECTIONAL COUPLERS

Both of the optical couplers 18 and 26 may be substantially identical; therefore, the following description of the structure and method of operation of the optical coupler 18 is applicable to all of the couplers employed in single mode fiber implementation of the invention.

A fiber optic directional coupler suitable for use in single mode applications as the couplers 18, 26 illustrated in FIG. 1 is described in the Mar. 29, 1980 issue of *Electronics Letters*, Vol. 16, No. 7, pp. 260–261.

As illustrated in FIGS. 2 and 3, the coupler 18, for example, includes a pair of single mode optical fibers 58 and 60 mounted in a pair of curved grooves 62 and 64, respectively, formed in optically flat, confronting surfaces of a pair of substrates or blocks 66 and 68, respectively. The substrate 66 with the fiber 58 mounted in the groove 62 comprises a coupler half 70, and the substrate 68 with the fiber 60 mounted in the groove 64 comprises a coupler half 72.

The curved grooves 62 and 64 each have a radius of curvature that is very large compared to the diameters of the fibers 58 and 60. The widths of the grooves 62, 64 are slightly larger than the fiber diameters to permit the fibers 58 and 60, when mounted therein, to conform to a path defined by the bottom walls of the grooves 62 and 64, respectively. The depths of the grooves 62 and 64 vary from a minimum at the centers of the substrates 66 and 68, respectively, to a maximum at the edges of the substrates 66 and 68, respectively. The variation in groove depth permits the fiber optic fibers 58 and 60, when mounted in the grooves 62 and 64, respectively, to gradually converge toward the center and diverge toward the edges of the substrates 66, 68, thereby eliminating any sharp bends or abrupt changes in direction of the fibers 58, 60 which may cause power loss through mode perturbation. The grooves 62 and 64 may be rectangular in cross-section, however, it will be understood that other suitable cross-sectional contours, such as U-shaped or V-shaped, that will accommodate the fibers 58, 60 may be used.

At the centers of the substrates 66, 68 in the embodiment shown, the depths of the grooves 62, 64 which mount the fibers 58, 60, respectively, are less than the diameters of the fibers 58, 60 after fabrication. At the edges of the substrates 66, 68, the depth of the grooves 62, 64 is preferably at least as great as the diameter of the fibers 58, 60. Fiber optic material is removed from each of the fibers 58, 60, e.g., by grinding and polishing, to form oval-shaped planar surfaces, which are coplanar with the confronting surfaces of the substrates 66, 68. These oval surfaces where the fiber optic material has been removed form an interaction region 74. Thus, the amount of fiber optic material removed increases gradually from zero toward the edges of the substrates 66, 68 to a maximum towards the centers of the substrates 66, 68. This tapered removal of the fiber optic material enables the fibers 58, 60 to converge and diverge gradually, which is advantageous for avoiding backward reflection and excessive loss of light energy.

In the embodiment shown, the coupler halves 70 and 72 are substantially identical and are assembled by placing the confronting surfaces of the substrates 66 and 68 together, so that the facing surfaces of the fibers 58 and 60 are juxtaposed in facing relationship.

Light is transferred between the fibers 58, 60 by evanescent field coupling at the interaction region 74. It has been found that to ensure proper evanescent field coupling, the amount of material removed from the fibers 58, 60 must be carefully controlled so that the spacing between the core portions of the fibers 58, 60 is within a predetermined critical zone. The evanescent fields extend a short distance into the cladding and decrease rapidly in magnitude with distance outside the fiber cores. Thus, sufficient material should be removed to permit overlap between the evanescent fields of the fibers 58, 60 with the cores of the fibers 60, 58, respectively. If too little material is removed, the cores will not be sufficiently close to permit the evanescent fields to cause the desired interaction of the guided modes; and thus, insufficient coupling will result. Conversely, if too much material is removed, the propagation characteristics of the fibers will be altered, resulting in loss of light energy due to mode perturbation. However, when the spacing between the cores of the fibers 50 is within the critical zone, each fiber 58, 60 receives a significant portion of the evanescent field energy from the other fiber 58, 60 to achieve good coupling without significant energy loss. The critical zone includes that area in which the evanescent fields of the fibers 58 and 60 overlap the cores of the fibers 60, 58, respectively, with sufficient strength to provide evanescent field coupling, i.e., each core is within the evanescent field of the other. However, as previously indicated, mode perturbation occurs when the cores are brought too close together. For example, it is believed that, for weakly guided modes, such as the $HE_{11}$ mode in single mode fibers, mode perturbation begins to occur when sufficient material is removed from the fibers 58, 60 to expose the fiber cores. Thus, the critical zone is defined as the core spacing in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone may be quite narrow. In a single mode fiber coupler of the type shown, the required center-to-center spacing between the fibers 58, 60 at the center of the coupler is typically less than a few (e.g., 2–3) core diameters.

Preferably, the fibers 58 and 60 (1) are identical to each other; (2) have the same radius of curvature at the interaction region 74; and (3) have equal amounts of fiber optic material removed therefrom to form the interaction region 74. Thus, the fibers 58, 60 are symmetrical through the interaction region 74 in the plane of their facing surfaces, so that their facing surfaces are coextensive if superimposed. Therefore, the two fibers 58 and 60 will have the same propagation characteristics at the interaction region 74, thereby avoiding reduction in coupling associated with dissimilar propagation characteristics.

The substrates or bases 66, 68 may be fabricated of any suitably rigid material. In one preferred embodiment, the bases 66, 68 each comprise generally substrates of fused quartz glass approximately 1 inch long, 1 inch wide, and 0.4 inch thick. In this embodiment, the optical fibers 58, 60 are secured in the slots 62, 64, respectively by a suitable cement (not shown), such as epoxy glue. One advantage of the fused quartz substrates 66, 68 is that they have a coefficient of thermal expansion similar to that of glass fibers; and this advantage is particularly important if the substrates 66, 68 and fibers 58, 60 are subjected to any heat treatment during the manufacturing process. For some applications the coupler 18 may comprise only the two fibers 58 and 60 with the corresponding exposed core portions being fused or bonded together without being secured in the substrates 66, 68.

The coupler 18 of FIG. 2 includes four ports, labeled 1, 2, 3 and 4. When viewed from the perspective of FIG. 2, ports 1 and 4 which correspond to fibers 58 and 60, respectively, are on the left-hand side of the coupler 16, while the ports 2 and 3, which correspond to the fibers 58 and 60, respectively, are on the right-hand side of the coupler 16. For the purposes of explanation, it is assumed that input light is applied to port 1. The input light passes through the coupler 18 and is output at either one or both of port 2 and port 4 depending upon the coupling between the fibers 58 and 60. The term "coupling constant" is defined as the ratio of the coupled power to the total output power. In the above example, the coupling constant equals the ratio of the power output at port 3 divided by the sum of the power output at ports 2 and 3. This ratio is also referred to as the "coupling efficiency", and when so used, is typically expressed as a percent. Thus, when the term "coupling constant" is used herein, it should be understood that the corresponding coupling efficiency is equal to the coupling constant times 100. For example, a coupling constant of 0.5 is equivalent to a coupling efficiency of 50%.

The coupler 18 may be tuned to adjust the coupling constant to any desired value between zero and 1.0 by offsetting the facing surfaces of the substrates 66, 68. Tuning may be accomplished by sliding the substrates 66, 68 laterally or longitudinally relative to each other.

The coupler 18 is highly directional, with substantially all of the power applied at one side thereof being output at the ports on the other side of the coupler 18. Substantially all of the light applied to input port 1 is delivered to the ports 2 and 3, without appreciable contra-directional coupling to port 4. Likewise, substantially all of the light input to port 2 is delivered to the ports 1 and 4. Further, the directional characteristic is symmetrical, so that substantially all of the light applied to either port 4 or port 1 is delivered to the ports 2 and 3. Moreover, the coupler 18 is essentially non-discriminatory with respect to polarizations, and thus, preserves the polarization of light input thereto. Thus, for example, if a light beam having a vertical polarization as viewed in FIG. 2 is input to port 1, the light cross-coupled from port 1 to port 3, as well as the light passing straight through from port 1 to port 4, will remain vertically polarized.

Light that is cross-coupled from one of the fibers 58, 60 to the other undergoes a phase shift of $\pi/2$, while light that is not cross-coupled is not shifted in phase during propagation through the coupler 18. Thus, for example, if light is input to port 1, the cross-coupled light output at port 3 will be advanced in phase by $\pi/2$, while the light passing straight through to port 2 remains unchanged in phase.

The coupler 18 is a low loss device, having insertion or throughput losses typically on the order of 0.1 to 0.2 percent. The term "insertion loss", as used herein, refers to the real scattering losses of light passing through the coupler 18 from one side to the other. For example, if light is applied to port 1, and 97% of that light reaches ports 2 and 3 (combined), the insertion loss would be 0.03 (3%). The term "coupler transmission" is defined as one minus the insertion loss. Thus, if the insertion loss is 0.03 (3%), the coupler transmission is 0.97 (97%).

POLARIZER

The polarizers 22, 36 and 42 included in FIG. 1 may be substantially identical. Therefore, the following description of a polarizer refers only to a polarizer 22 for convenience.

Figure 8:
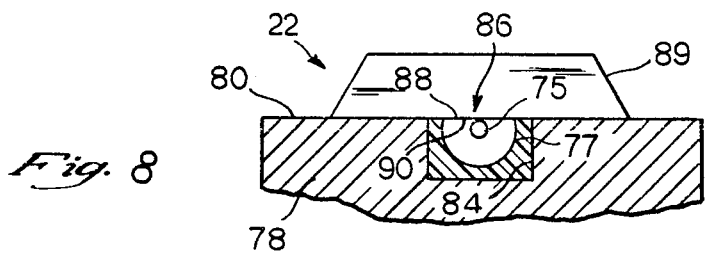
FIG. 8 is a partial cross sectional view of the polarization control system of FIG. 7.

Referring to FIGS. 7 and 8, the polarizer 22 includes a substrate 78 having an optically flat surface 80 thereon. The fiber optic waveguide 14, having a core 75 and a cladding 77 is mounted within a curved slot 84 formed in the optically flat surface 80 of the substrate 78. Since the primary function of the substrate 78 is to hold the fiber optic waveguide 14 in a predetermined position, the substrate 78 may be formed of any suitably rigid material. In the preferred embodiment, the substrate 78 comprises a block of fused quartz; and a suitable cement, such as epoxy glue, secures the fiber optic waveguide 14 in the slot 84.

As best shown in FIG. 8, in the central region of the substrate 78, the depth of the slot 84 is less than the diameter of the fiber optic waveguide 14. An outer portion of the cladding 77 is removed to form an interaction zone 86 from which light may be coupled out of the fiber optic waveguide 14. The cladding 77 is removed in the interaction zone 86 to form a flat surface 88 that is coplanar with the optically flat surface 80 of the substrate 78. At the edges of the substrate 78 the depth of the slot 84 is preferably at least as great as the diameter of the fiber optic waveguide 14 so that the cladding 77 remains intact. Therefore, the amount of cladding 77 removed increases gradually from zero at the edges of the substrate 78 to a maximum near the center thereof in the interaction zone 86 as in the coupler half 72.

A crystal 89 formed of a birefringent material is mounted on the substrate 78 in close proximity to the core 75 of the fiber optic waveguide 14 in the interaction zone 86. The crystal 89 has an optically flat surface 90 facing the optically flat surface 80 of the substrate 78. The crystal 89 is positioned to partially intersect the path of light propagating in the fiber optic waveguide 14 so that evanescent field coupling may couple light from the fiber optic waveguide into the crystal 89.

The crystal 89 comprises a body of birefringent material in order to provide different wave velocities therein for light of different polarizations. With polarizations for which the wave velocity in the crystal 89 is less than the wave velocity in the fiber 14, the light carried by the fiber optic waveguide 14 excites a bulk wave in the crystal 89, which causes light to escape from the fiber 14. No bulk wave is excited in the crystal 89 for polarizations having wave velocities in the crystal greater than in the fiber so that light having such polarizations remains guided by the fiber optic waveguide 14. Therefore, proper selection and orientation of the crystal 89 of birefringent material causes light of a first selected polarization to be retained within the fiber optic waveguide 14 while light of a second selected polarization is removed therefrom and transmitted away from the fiber optic waveguide 14 through the crystal 89. The indices of refraction of the crystal 89 are such that a wave having polarization along one of the principal axes of the crystal 89 will propagate more slowly in the crystal 89 than in the fiber optic waveguide 14; and a wave having polarization along a second principle axis will propagate at a greater speed in the crystal 89 than in the fiber optic waveguide 14.

The crystal 89 is chosen to have at least one refractive index that is equal to or greater than the refractive index of the core 75 of the fiber optic waveguide 14 and a second refractive index that is equal or less than the refractive index of the cladding 77. In a preferred embodiment, the crystal 89 has one index of refraction that is greater than the index of refraction of the core 75 and two indices of refraction that are less than the index of refraction of the cladding 77. This relationship of refractive indices permits orientation of the crystal 89 to adjust the lossiness of one polarization without affecting the loosiness of other polarizations. In the illustrated embodiment, the crystal 89 is preferably cut so that the axis of the largest index of refraction lies in the plane of the optically flat surface 88.

In a preferred embodiment, the diameter of the core portion 75 is on the order of 4 microns, and the separation between the crystal 89 and the core 75 is on the order of 0.1 micron. In this embodiment, the curved slot 84 has a radius of curvature on the order of 25 centimeters, and the interaction region 86 between the fiber optic waveguide 14 and the crystal 89 is approximately 1 millimeter long.

In a preferred embodiment, the core 75 of the fiber optic waveguide 14 is formed of amorphous silica having an effective index of refraction of approximately 1.46; and the crystal 89 comprises a potassium pentaborate ($KB_5O_8 \cdot 4H_2O$) crystal having the following refractive indices at a wave length of 633 nm in vacuo: $n_a = 1.49$, $n_b = 1.43$, and $n_c = 1.42$, where a, b and c correspond to the axes of symmetry of the crystal 89. The crystal 89 is cut in a plane perpendicular to the vertical b axis; and the cut surface 90 is polished and placed against the fiber optic waveguide 14 in the interaction region 86. For light polarized perpendicular to the crystal-fiber interface 90, the refractive index ($n_b = 1.43$) of the crystal 89 is less than the refractive index 1.46 of the fiber optic waveguide 14, which causes light propagating within the fiber optic waveguide 14 to remain therein because of total internal reflections at the crystal-fiber interface 90.

The index of refraction n for polarization parallel to the crystal-fiber interface 90 lies between $n_c = 1.42$ and $n_a = 1.49$ corresponding to the following relationship:

$$n \simeq \left[ \frac{\sin^2 \theta}{n_c^2} + \frac{\cos^2 \theta}{n_a^2} \right]^{-\frac{1}{2}} \quad (1)$$

where $\theta$ is the angle between the direction of propagation and the c axis of the crystal. In an effective polarizer the orientation of the crystal 89 is chosen to make the slower wave velocity in the crystal 89 very close to the wave velocity within the fiber optic waveguide 14, since it has been found that the efficiency of coupling from the fiber optic waveguide 14 to the crystal 89 increases as the wave velocity in the crystal 89 becomes closer to the wave velocity in the fiber optic waveguide 14.

In a preferred method of assembly, the fiber 14 is bonded into the curved slot 84 using an appropriate cement, and the fiber 14 and substrate 78 are ground and polished together until the desired amount of cladding 77 has been removed from the fiber optic waveguide 14 in the interaction region 86. The polished face 90 of the crystal 89 is then placed against the surface 80 of the substrate 78, and pressure is applied to reduce the separation therebetween to a fraction of a micron. An index matching oil having an index of refraction of approximately 1.45 is inserted between the crystal 89 and the fiber optic waveguide 14 by means of capillary action to provide optical matching between the crystal 89 and the fiber optic waveguide 14 and to reduce frictional forces that must be overcome to properly position the crystal 88 on the substrate 78.

Figure 9:
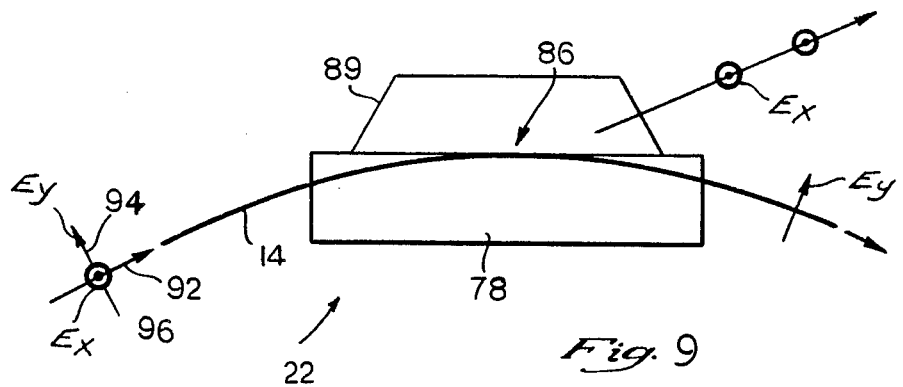
FIG. 9 is is a schematic representation of the operational characteristics of the polarizer system of FIG. 7.

Referring to FIG. 9, a transverse electromagnetic (TEM) wave typically has two modes of polarization in a single mode fiber. The light input to the polarizer 22 is represented by a first arrow 92 which indicates the direction of propagation of the light wave and a second arrow 94 perpendicular to the arrow 92 to indicate one direction of polarization. The other direction of polarization is indicated by a circle 96 with a dot in the center thereof at the intersection of the arrows 92 and 94. The circle 96 and dot represent a polarization vector pointing out of the plane of the page parallel to the optically flat surfaces 90 and 80. With the crystal 89 being cut and oriented with respect to the fiber optic waveguide 14 as described above, the index of refraction of the crystal 89 for light represented by the polarization vector 94 is less than the effective index of refraction of the fiber optic waveguide 14 so that light having polarization indicated by the polarization vector 94 propagates past the crystal 89 through the fiber optic waveguide 14 by means of total internal reflection at the crystal-fiber interface. For light polarized parallel to the crystal-fiber interface 90, the index of refraction of the crystal 89 is approximately equal to or greater than the effective index of refraction of the fiber so that the wave velocity in the crystal 89 for this polarization is approximately equal to or less than the wave velocity in the fiber optic waveguide 14. Therefore, light polarized parallel to the crystal-fiber interface 90 excites a bulk wave in the crystal 89 and escapes from the fiber optic waveguide 14. The result is that the light which remains within the fiber optic waveguide 14 is highly polarized in the direction perpendicular to the plane 90 of the crystal 89.

The extinction ratio of the polarizer 22 is the ratio of light having the undesired polarization mode retained in the fiber optic waveguide 14 to the light of the desired polarization mode retained within the fiber optic waveguide 14, assuming equal inputs of both modes into polarizer 22. The polarizer 22 constructed in accordance with the foregoing description is capable of providing an extinction ratio in excess of 80 dB, with a throughput loss of light of the desired polarization of only a few percent. The two most important parameters of the polarizer 22 are the extinction ratio and the insertion loss. Optical gyroscopic applications require extinction ratios greater than 80 dB and insertion loss of less than 10%. The polarizer 22 is capable of achieving an extinction ratio of about 100 dB while the best bulk optic polarizers have extinction ratios of about 50-60 dB.

POLARIZATION CONTROLLER

The performance of fiber optic apparatus such as the rotation sensors 10 depends critically upon the state of polarization in the fiber. The fiber optic polarizers 16, 34 and 46 included in the gyroscope system 10 of the present invention electronically control the state of polarization in the fiber optic waveguide 14, taking an arbitrary input state of polarization and transforming it into a desired output state of polarization. The polarization transformation is accomplished by placing three adjustable birefringent sections in the optical path of light guided in the fiber optic waveguide 14 to control the state of polarization input to the polarizer 22.

FIG. 4 shows one type of polarization controller suitable for use, for example as the polarization controller 16 in the rotation sensor of FIG. 1. The polarization controller 16 includes a base 98 on which a plurality of upright blocks 99-102 are mounted. Between adjacent blocks 99-102, spools 103-105 are tangentially mounted on shafts 106-108, respectively. The shafts 106-108 are axially aligned with each other, and are rotatably mounted between the corresponding blocks 99-102. The spools 103-105 are generally cylindrical and are positioned tangentially to the shafts 106-108, with the axes of the spools 103-105 being perpendicular to the axes of the shafts 106-108, respectively. The fiber 14 extends through axial bores in the shafts 106-108 and is wrapped about each of the spools 103-105 to form three corresponding coils 109-111. The radii of the coils 109-111 are such that the fiber 14 is stressed to form a birefringent medium in each of the coils 109-111. The three coils 109-111 may be rotated independently of one other about the axes of the shafts 103-105, respectively, to adjust the orientation of the birefringence of the fiber 14 and, thus, control the polarization of the light passing therethrough.

The diameter and number of turns in the coils 109-111 are such that the outer coils 109 and 111 provide a phase delay of one-quarter wavelength, while the central coil 110 provides a phase delay of one-half wavelength. The quarter wavelength coils 109 and 111 control the ellipticity of the polarization, and the half wavelength coil 110 controls the direction of polarization. The polarization controller 16 provides a full range of adjustment of the polarization of the light propagating through the fiber 14.

FIGS. 5 and 6 illustrate a preferred type of polarization controller for use in the gyroscope system 10. As shown in FIG. 7, each of the polarization controllers 34 and 46 may include three fiber squeezers 126-128 and 130-132, respectively to apply anisotropic stresses to the fiber optic waveguide 14 to induce birefringence through the photoelastic effect. The photoelastic effect changes the indices of refraction of the fiber 14 in response to the applied stress. Referring to FIGS. 5 and 6, each of the fiber squeezers 126-128, and 130-132 comprises a piezoelectric actuator element 134 mounted inside a rectangular aperture 136 in a generally rectangular frame 138. One end of the piezoelectric actuator element contacts the fiber optic waveguide 14, which is held between the piezoelectric element and a portion of the frame. It is well-known that application of an electric field to a piezoelectric material produces a stress therein in a repeatable, predictable manner in response to the applied electric field. Ordinarily the stress produced in the piezoelectric actuator element 134 is proportional to the applied electric field.

The fiber optic polarizer system 22 includes the three fiber squeezers 126-128 at one side of the polarizer 22 and the three fiber squeezers 130-132 at the opposite side of the polarizer 22 to change an arbitary state of polarization input from either direction to a specific linear stage of polarization at the polarizer 22. This transformation can be accomplished with two squeezers, e.g. squeezers 126, 127, provided that the birefringence existing within the fiber between the polarization controller and the polarizer 22 is negligible, which is approximately true over a limited path length. If the path length is such that the birefringence of the fiber optic wave guide 14 is not negligible between the polarization controller 46 and the polarizer 22, the third squeezer 128 will be required to produce the desired linear state of polarization for input to the polarizer 22. The required voltage and the force per unit length exerted on the fiber to produce the desired polarization change could be reduced, or the dynamic range of the polarization controller could be extended by increasing the length of the piezoelectric actuator element.

Referring to FIG. 5, fiber squeezers 127-128 are placed in line with the fiber optic waveguide passing therethrough. Each squeezer has a defined axis for applying stress to the fiber. In order to produce the desired polarization transformation, the axis of applied stress are arranged at 45° to one another. Each squeezer achieves a phase shift which is parallel to the axis of the squeezer and a second phase shift that is perpendicular to the squeezer axis. Therefore, the three fiber squeezers 126-128 are capable of changing the polarization along two axes perpendicular to one another and to the fiber optic waveguide 14.

It is preferable that the piezoelectric material used in the fiber squeezers have a Curie temperature greater than 85° C. The piezoelectric effect vanishes at temperatures greater than the Curie temperature, but this specification is easily met in practice by using a material such as lead titantate-lead zirconate. Such piezoelectric materials have Curie temperatures of about 300° C. Calculations show that a piezoelectric actuator element of a practical size having a height of about 8.9 millimeters, a length of about 6.4 millimeters and a thickness of about 3.2 millimeters and applied voltage of about 10 volts produces a phase change of 180° for fibers that are about 100 microns in diameter. A dynamic range of plus or minus 720° would thus require a control voltage range of 0 to 80 volts, which would produce forces on the fiber of approximately $8 \times 10^{-4}$ dyne/cm, which is an order of magnitude below the threshold force for causing damage to the fiber.

THE CONTROL CIRCUITS

Referring again to FIGS. 7, 10 and 11, the crystal 89 has a pair of planes 140, 142 thereon with a first photodetector 144 mounted to the plane 140 and a second photodetector 146 being mounted to the plane 142. The first photodetector 144 is arranged to have incident thereon light which was initially propagating from right to left in the fiber optic waveguide 14 and which was subsequently coupled out of the fiber optic waveguide 14 into the crystal 89. The second photodetector 146 is arranged to have incident thereon light which was initially traveling from left to right in the fiber optic waveguide 14 and which was coupled therefrom into the crystal 89. The first photodetector 144 outputs a signal to a first controller 148, which outputs control signals to the fiber squeezers 126-128, which are oriented as shown in FIG. 5 with respect to the fiber optic waveguide 14. The second photodetector 146 outputs control signals to a second controller 150 which outputs control signals to the fiber squeezers 130-132. Thus the fiber optic polarizer system 34 is capable of producing light of a desired polarization output regardless of the direction of the input light signal.

An arbitary state of polarization may be represented by components $E_x$ and $E_y$ where $E_x$ is represented as previously explained with reference to FIG. 9 by the encircled dot as being directed out of the plane of FIG. 9 and perpendicular to the fiber 14. $E_y$ is also perpendicular to the fiber 14. The state of polarization of the incoming light may be defined by two parameters, A and $\Delta$, where $A^2 = E_x^2/E^2$, with $E^2$ being equal to $E_x^2 + E_y^2$; and $\Delta$ is the phase difference between the x and y-polarizations. Therefore, the incoming light may be expressed in a matrix representation as $$1/|E| \begin{bmatrix} E_x \\ E_y \end{bmatrix} = \begin{bmatrix} A \\ (1 - A^2)^{\frac{1}{2}} \exp(i\Delta) \end{bmatrix} \quad (2)$$

Figure 10:
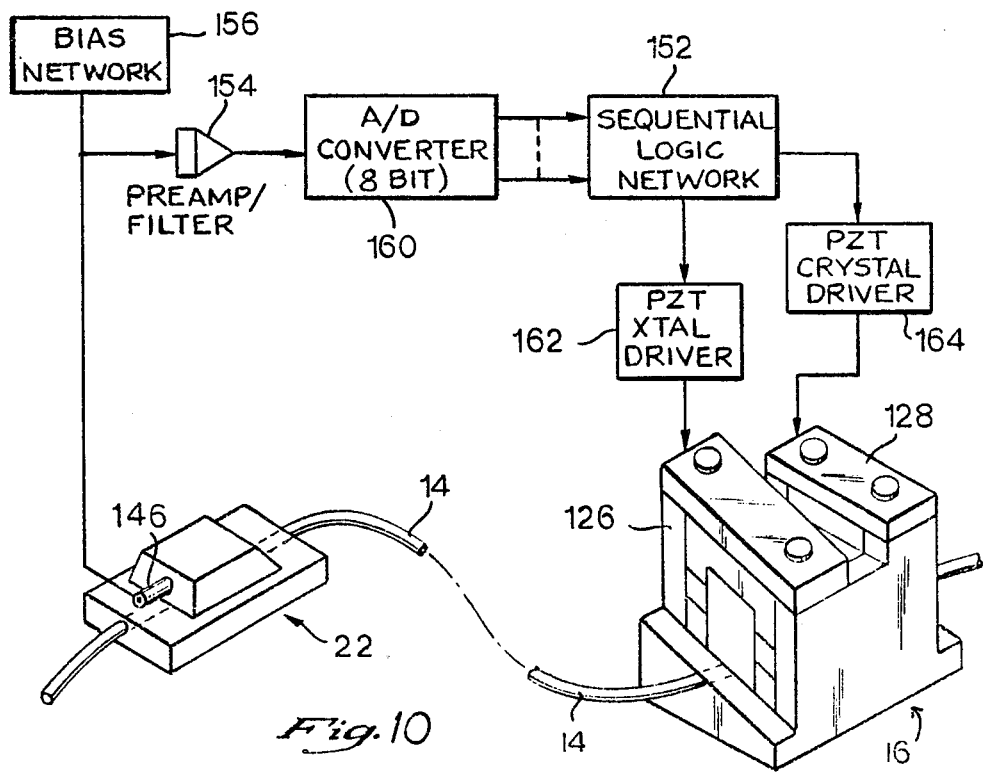
FIG. 10 is a schematic representation of the polarizer system of FIG. 7 and a block diagram of a control circuit therefor.

The parameters to be controlled are $r_1$ and $r_2$ the differences between the parallel and orthogonal phase shifts by the fiber squeezers 126, 128 with respect to the squeezer axis. As shown in FIG. 10, it is desired that the light input to the polarizer 22 and the light output therefrom have a polarization only in the y-direction. As described above, the crystal 89 couples light polarized in the x-direction traveling from left to right in the fiber optic waveguide 14 out of the fiber toward the second photodetector 146. If all of the light input to the polarizer 22 has the desired polarization, there will be no light incident through the crystal upon the second photodetector 146. Therefore, the light incident upon the second photodetector 146 is regarded as an error signal which is processed by the first controller 150, which then sends control signals to the fiber squeezers 126-128 to null the error signal. The error signal observed at the photodetector 146 is a function of the phase differences $\Gamma_1$ and $\Gamma_2$, which are linear with respect to the control voltages applied to the fiber squeezers 126 and 128. The error signal is given by $$S(\Gamma_1, \Gamma_2) = A^2 \cos 178\, \sigma_2 + (1-A^2) \sin \tfrac{1}{2}\sigma_2 - A(1-A^2) \sin \Gamma_2 \sin (\Gamma_1 - \Delta) \quad (3)$$

Figure 11:
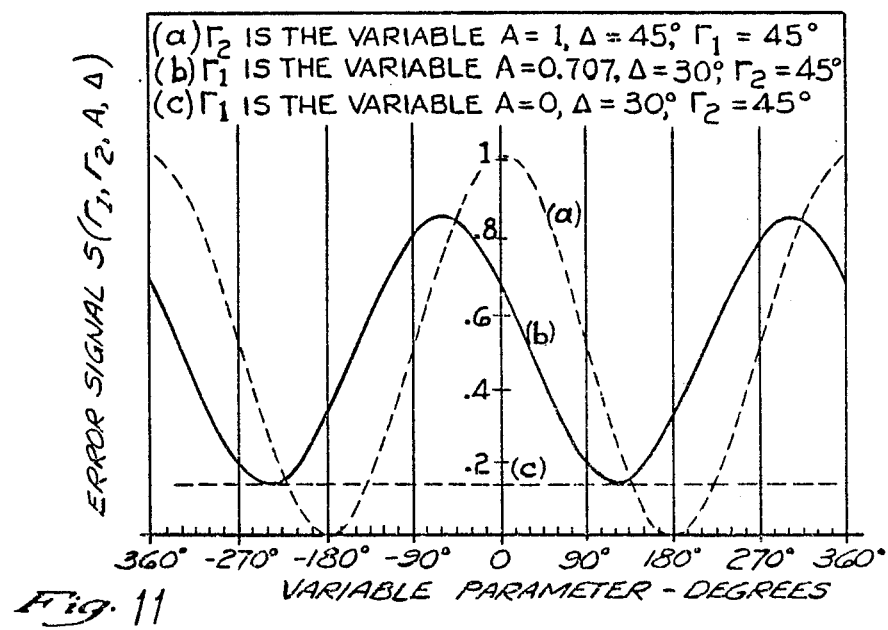
FIG. 11 graphically illustrates error signals output to the control circuitry of FIG. 10 as functions of various parameters.

FIG. 11 illustrates computer plots of error signals for controlling the polarization input to the polarizer 22. Curve (a) uses $\Gamma_2$ as the variable with $A=1$, $\Delta=45°$ and $\Gamma_1=45$. Curve (b) uses $\Gamma_1$ as the variable with $A=0.707$, $\Delta=30°$ and $\Gamma_2=45°$. Curve (c) uses $\Gamma_1$ as the variable with $A=0$, $\Delta=30°$ and $\Gamma_2=45°$. For a given input state of polarization, the error signal varies sinusoidally with ether of $\Gamma_1$ or $\Gamma_2$. In the special cases of $A=0$ or $A=1$, the error signal is independent of $\Gamma_1$, since in each of the special cases the coefficient of the term involving $\Gamma_1$ is 0. In these special cases, the incoming state of polarization is either parallel or orthogonal to the axis of the fiber squeezer 130. With a change in the control voltage applied to the fiber squeezer 130, the phase of the light may change by an amount equal to $\Gamma_1$, but the state of polarization will remain constant. If the incoming state of polarization is aligned with the axes of fiber squeezer 130, $\Gamma_2$ may be at 0, $\pm 2\pi$, $\pm 4\pi$, etc. to obtain the desired output. If the incoming state of polarization is orthogonal to the fiber squeezer 126, $\Gamma_2$ may be at $\pm \pi$, $\pm 3\pi$, etc. to obtain the desired alignment of the polarization of the light in the fiber for input to the polarizer 22.

The control signal will be obtained by modulations of $\Gamma_1$ and $\Gamma_2$ to observe the effect on the error signal. Modulation may be accomplished by an iterative system such as that shown in FIG. 10 which uses a sequential logic network 152. The output of the photodetector 146 is input to a preamplifier and filter network 154, which also receives an input from an appropriate bias network 156. The amplified and filtered signal is input to an analog to digital converter 160, which may be an 8 bit A/D converter, for input to the sequential logic network 152. The sequential logic network 152 is programmed with an algorithm that drives the fiber squeezers 126 and 128 so as to minimize the output detected therefrom. In an iterative fashion, and by amounts porportional to the detected error signal, the sequential logic network 152 alternately applies corrections to the fiber squeezers 126 and 128 through a pair of crystal drivers 162 and 164, respectively, until a minimum error signal below a preselected value is reached. Since the sampling and correction rates are preferably greater than 2,000 per second, the noise generated in the sequential logic network 152 is well above the band width of the fiber optical system for gyroscopic applications. In general the noise generated can be placed outside the signal band of interest.

The polarizer 22 and polarization controller 16 preferably cooperate according to the following specifications:

| | |
|---|---|
| Extinction ratio | >80 dB |
| Losses | <10% |
| Control band width | 500 Hz |
| Polarization noise suppression ratio | 40 dB |
| Cross-polarization suppression ratio | 20 dB |
| Design wave length | 820 nm |

Thus the fiber optic polarizer 22 and the polarization controller 16 processes incoming light of an arbitrary polarization and produces an output light signal of a preselected polarization with minimal losses is suitable for processing light signals for input to the sensing coil 32 of the all fiber optic gyroscope 10.

FREQUENCY SHIFTER

FIG. 12 represents circularly polarized input light being incident upon a half-wave plate 17 that is rotating at an angular velocity f. The input wave is shown to have a frequency $f_o$. The wave is traveling in the positive z-direction and has equal magnitude polarization vectors along the x- and y-axes which are 90 degrees out of phase. Therefore, the polarization vector appears to rotate at angular velocity $f_o$ about the z-axis in a clockwise direction when viewed looking toward the direction of propagation. The half-wave plate 17 rotates in the same direction as the polarization vector so that the output wave is frequency shifted from the input frequency $f_o$ to have a frequency of $f_o+2f$.

FIG. 13 graphically represents the possible frequency outputs from the frequency shifter 17. If the input frequency is $f_o$, then rotating the half-wave plate at a frequency f in the direction of polarization of the input beam produces an output of $f_o+2f$. Rotating the half-wave plate 176 at the frequency f opposite in direction to the polarization of the circularly polarized input wave produces an output frequency of $f_o-2f$. Controlling the rotational frequency f permits the output frequency of the quarter-wave plate to have a range of $f_o \pm 2f_{max}$, where $f_{max}$ is the maximum rotational frequency of the half-wave plate 17.

FIG. 14 illustrates a fiber optic frequency shifter 180 wherein an electrostrictive material forms a jacket 182 surrounding the cladding 77 of the fiber 14. Suitable materials for forming the jacket 182 are polyvinylidene fluoride, commonly called $PVF_2$ and zinc oxide ZnO. $PVF_2$ is generally applied from a melt onto the fiber 14. A plurality of electrodes 184–187 separated by insulators 190 are coated onto the jacket 182. A suitable material for forming the electrodes 184–187 is any electrically conductive substance that may be sputtered or painted on the jacket 182. In the embodiment shown in FIG. 15, the layer of $PVF_2$ should be 2–3 times the diameter of the cladding 77 so that applying an electric field to the electrodes 184–187 produces a rotating birefringence in the fiber 14. The electrodes 186 and 187 are grounded, and the electrode 185 receives an electrical signal having a frequency f from an oscillator 192. A phase shifter 194 is connected between the oscillator 192 and the electrode 184. The output of the phase shifter 194 preferably is phase shifted by 90 degrees from the input so that the electrodes 184 and 185 have electrical signals having a phase difference of 90 degrees applied thereto.

If the thickness of the $PVF_2$ jacket 182 is 2–3 times the diameter of the fiber cladding 77, then application of the 90 degree out of phase signals to the electrodes 184 and 185 with the electrodes 186 and 187 being grounded produces two electric field vectors that are 90 degrees out of phase in the $PVF_2$ jacket 182. The resultant electric field rotates at the oscillator frequency f. The electric field vectors cause the $PVF_2$ material to constrict about the fiber 14 to form a generally elliptical configuration.

The rotating electric field vectors act upon the jacket material 182 and produces a rotating force vectors. The rotating force vector produces a rotating stress field in the jacket 182 and in the fiber 14. The rotating stress causes a rotating strain change in the core of the optical fiber 14, which changes the index of refraction in the direction of the strain by means of the photoelastic effect. Therefore, the rotating stress field produces a rotating birefringence in the fiber 14. It is well known that a light wave propagating through a birefringent material undergoes a phase shift that is dependent upon the birefringence.

FIG. 15 illustrates a second fiber optic frequency shifter 196, which is modification of the frequency shifter 180 of FIG. 4. An electrode 198 is coated around the periphery of the fiber cladding and is grounded. The oscillator 192 is connected directly to the opposing electrodes 184 and 186 and is connected to the electrodes 184 and 186 through the 90 degree phase shifter 194. The advantage of the electrode configuration of FIG. 15 is the provision of higher electric fields in the jacket 182 for the same output of the voltage oscillator 192 and thickness of the jacket 182 than is possible with the embodiment of FIG. 14. The electric field in the jacket 182 depends inversely upon the distance between the grounded and ungrounded electrodes. Having the grounded electrode 198 around the fiber as shown in FIG. 15 causes the distance between grounded and ungrounded electrodes to be less than in the configuration of FIG. 14.

Referring to FIG. 16, it is possible to construct a frequency shifter 200 according to the invention using six substantially identical electrodes 201–206. The central electrode 198 is grounded as shown in FIG. 16. The ungrounded electrodes 201–206 are driven by an oscillator, such as the oscillator 192, with adjacent electrodes being driven by signals that are 120 degrees out of phase with one another. A 120 degree phase shifter 208 connected between the oscillator 192 and the electrodes 202 and 205 and a $-120$ degree phase shifter 209 connected between the oscillator 192 and the electrodes 203 and 206 provide the desired phase difference. The electrode configuration of FIG. 16 permits the use of a thinner layer for the jacket 182 than is possible with the embodiment of FIG. 15. The electrodes 184–187 and 198 of the embodiment shown in FIG. 15 apply diametrically opposed squeezes to the fiber, and the result may be merely as two perpendicular fiber squeezes, but no rotating birefringence if the material of the jacket 182 is less than 2–3 times the diameter of the fiber cladding 77. The electrode configuration of FIG. 17 does not apply two perpendicular squeezes to the fiber; therefore, driving the electrodes 201 and 204 directly by the oscillator 192 and the electrodes 202 and 205 through the 120 degree phase shifter and the electrodes 203 and 206 through the $-120$ phase shifter, respectively, readily produces a rotating field and a rotating birefringence in the jacket 182 and the fiber core 75.

By properly controlling the voltage of the output oscillator 192 and properly choosing the thickness and length of the jacket 182, it is possible to control the birefringence of the length of the fiber 14 so that it appears to be a rotating half-wave plate to an input light wave. The length of the jacket 182 is determined in part by the mechanical and electromagnetic properties of the fiber 14 and the material comprising the jacket 182. Other considerations in determining the length of the jacket 182 are the peak electromagnetic fields applied to the jacket 182 and the dielectric breakdown strength of the jacket 182. The birefringence of the fiber is also a factor that must be considered in determining the dimensions of the jacket 182. The ideal case is to have the length of the fiber 14 enclosed in the jacket 182 appear to be half a wavelength at peak applied field.

Referring to FIG. 17, a fiber optic frequency shifter 212 includes a block 214 of electro-optically active birefringent material placed adjacent a half-coupler 216. The half-coupler 216 comprises a length of the fiber 14 with the core 75 and the cladding 77 disposed within a slot 224 in a substrate 236, which is preferably a quartz block. A portion of the cladding 77 has been removed from the fiber 14 at the outer edge of the groove 224 to form an interaction region 228. The groove 224 is preferably convexly curved as shown in FIG. 2. The groove 224 may have a rectangular cross-section as shown in FIG. 17, or the groove 224 may have any other convenient bottom surface. Formation of the half-coupler 216 ordinarily initially involves steps similar to those used to form the half couplers 70 and 72 of FIG. 2.

Only a relatively small portion 232 of the block 214 in which the evanescent field of light propagating in the fiber penetrates affects the birefringence of the optical fiber 14. As shown by the dotted line 233, the region of concern is an arc having a radius of about 10 microns centered on the core 75. Only the phase characteristics of the input optical wave are important in the interaction of the light in the fiber 14 with the block 214.

The block 214 may be formed of an electro-optically active birefringent material, such as lithium niobate. Preferably, the block 214 is formed of materials such as sodium nitrate or potassium dithionate, which have refractive indices similar to that of the fiber 14. When a birefringent material is placed in the evanescent field of light propagating in a nonbirefringent fiber, the composite structure becomes birefringent. The principal axis of the birefringent material determines the principal axis of the composite structure. If the fiber 14 is a single mode optical fiber, it will guide only modes in which the electric and magnetic vectors are mainly transverse to the direction of propagation of light through the fiber 14. Therefore, the fields in the fiber 14 are directed across the fiber core 75 and have evanescent fields in the cladding 77. The evanescent wave may be regarded as being formed of two components that are orthogonal to one another and which lie along the principal axis of the block 214 of birefringent electro-optic material.

Referring again to FIG. 17, an electrode 252 is positioned in the bottom of the groove 224 in contact with the cladding 77. The electrode 252 may be flat as shown in FIG. 17 or it may conform to the curved shape of the cladding 77.

The block 214 of electro-optically active material has a plurality of electrodes 238, 240 and 242 attached thereto. The electrode 238 is placed above the block 214 as shown in FIG. 17 in generally parallel alignment with the interaction region 228. The electrodes 240 and 242 are mounted to end faces 244 and 246, respectively, of the block 214.

As shown in FIG. 17, the electrodes 240 and 252 are grounded. The output of an oscillator 248 is connected directly to the electrode 238 and to a phase shifter 250. The phase shifter 250 preferably produces an output that is phase shifted by 90 degrees from the input. The output of the phase shifter 250 is connected to the electrode 242 so that the electrodes 238 and 242 are driven by voltages that are 90 degrees out of phase.

If the birefringent material 214 and the length of the interaction region 228 are correctly choosen, then application of voltage from the oscillator 248 directly to the electrode 238 and to the electrode 242 through the phase shifter 250 with the electrodes 240 and 252 being grounded, then a rotating half-wave plate can, in effect, be formed in the fiber 14. Application of the 90 degree out-of-phase voltages to the electrodes 238 and 242, forms rotating electric fields which causes the electro-optically active birefringent material 214 to result in a rotating birefringence therein. Since the birefringence of the block 214 determines the birefringence of the frequency shifter 212, light propagating in the fiber 14 encounters a rotating birefringence when traveling through the portion of the core 75 adjacent the interaction region 228. Circularly polarized light propagating through the interaction region 228 undergoes a frequency shift as described above.

If perturbations exist in the rotating birefringence or in the state of polarization of the input light, then harmonics are generated during the frequency shifting operation.

It is possible to form an evanescent field frequency shifter without having the fiber 14 mounted in the substrate 216. The desired portion of the cladding 77 may be ground away to form the interaction region 228. The electrode 252 may be adhered directly to the fiber 14, and the electrodes 238–242 adhered to the birefringent block 214.

The interaction region 228 must appear to have a length equal to an odd integral number of half wavelengths in order to produce an output wave having frequency $f_o \pm 2f$, where f is the oscillator frequency. If the length of the interaction region 228 is not an odd integral number of half wavelengths, then a portion of the carrier frequency $f_o$ is transmitted through the frequency shifter 212.

The amplitude of the outputs of the frequency shifters 40 of FIGS. 14–17, is given by $$\Phi(t) = A \exp[j(f_o + 2f)t] + B \exp[jf_o t] \qquad (4)$$

The intensity of the output wave is the square of the amplitude and is given by $$I = |\Phi(t)|^2 \qquad (5)$$

$$= A^2 + B^2 + 2AB \cos(2ft) \qquad (6)$$

The coefficient A is ordinarily much larger than B so that $B^2$ is negligible. FIG. 18 illustrates a feedback control system 253 for controlling the output frequency of a frequency shifter 254 to minimize the underdesired carrier frequency component. The frequency shifter 254 may be any of the frequency shifters 180, 196, 200, and 212 shown in FIGS. 14–17.

The frequency shifter 254 has incident thereon a light wave of frequency of $f_o$ from the light source 12. The incident wave has a clockwise circular polarization as seen looking from the light source 12 toward the frequency shifter 254. The amplitude output from the frequency shifter 254 is given by Equation (1). The term $B \exp[jf_o t]$ represents an undesired portion of the carrier input signal that has propagated through the frequency shifter 254. The output beam of the frequency shifter 254 is incident upon a beam splitter 258, which may, for example, transmit approximately 90% of the incident light straight through while reflecting approximately 10% of the incident light upon a polarizer 260.

The unwanted portion of the output intensity has the same polarization as the input wave while the desired portion of the output intensity has the opposite polarization. The polarizer 260 transmits only a portion of each wave. The output of the polarizer 260 is incident upon a photodetector 262, which outputs an error signal indicative of the third term of Equation (6).

The error signal is input to a lock-in amplifier 264. A voltage source 266 supplies a voltage V to a voltage-controlled-oscillator 268, which produces an oscillatory voltage having a frequency f that is a function of the voltage V. The output of the voltage-controlled-oscillator 268 is amplified by a variable gain amplifier 270 to provide a control signal to the frequency shifter 254 and to a double 272. The doubler 272 provides an output signal having a frequency of 2f to the lock-in amplifier 264, thereby causing the lock-in amplifier 264 to amplify only signals having frequency 2f, which is the frequency of the third term of Equation (6). The output of the lock-in amplifier 264 is a voltage proportional to 2AB, the coefficients of the third term, 2AB cos (2ft) of Equation (6). The output of the lock-in amplifier 264 passes through a filter 274 to a comparator 276 that has one grounded input. Therefore, if the voltage proportional to 2AB that is input to the comparator 276 is not zero, then the comparator 276 produces an output voltage that is input to the gain control of the variable gain amplifer 270 as a negative feedback signal to either increase or decrease the voltage of the control signal input to the frequency shifter 254. The negative feedback signal causes a reduction in the coefficient B, which reduces the error signal and causes the output of the frequency shifter 254 to have the desired frequency.

Another type of frequency shifter 300 that may be used in the fiber optic gyroscope 10 is shown in FIG. 20. The frequency shifter 300 includes a length of optical fiber 320 retained between a block 304 formed of a material such as aluminum and a block 306 formed of a material such as fused quartz. The optical fiber 302 is preferably formed to propagate a single mode of electromagnetic energy in the optical frequency range. The quartz block 306 preferably is formed to have a wedge-shaped configuration so that a first surface 308 of the block 306 contacts the optical fiber 302, and a second surface of the block 306 is oriented at an angle to the longitudinal axis of the fiber 302. The aluminum block 304 may be of any desired shape and is shown to have a rectangular cross section only for convenience of illustration. A metallic layer 312 comprising Cr-Au, for example, is formed on the surface 310, and a transducer 314, formed of PZT, for example, is mounted to the metallic layer 312. The PZT transducer 314 may have a metallic layer of Cr-Au formed on a surface 318, which faces away from the surface 310 of the quartz block 306. The transducer 314 may be driven by a suitable oscillator 316 to launch an acoustic wave in the fiber 302.

The fiber 302, being a single mode fiber, supports two orthogonal polarizations of the single propagation mode. There are two polarizations because the fiber 302 is birefringent, having different refractive indices for different directions of the electric field in the fiber. The two polarizations are normally uncoupled so that there is no energy transfer from one polarization to the other. A spatially periodic stress pattern imposed on the fiber 302 induces coupling between the two polarizations, leading to power transfer therebetween. It has been found that the power transfer is cumulative only if the spatial period of the stress pattern equals the beat length of the fiber 302. The beat length of the optical fiber 302 is $L_B = \lambda/\Delta n$, where $\Delta n$ is the difference in the refractive indices for the two polarizations and $\lambda$ is the optical wavelength. It as been found that a stress pattern is most effective in causing coupling of the two polarizations when the stress is directed at 45 degrees to the principal axes of birefringence.

The transducer 302 forms a moving stress pattern in the fiber 302 by means of the travelling acoustic wave. If the stress pattern moves along the fiber, light coupled from one polarization to the other is shifted in frequency by an amount equal to the frequency of the moving stress pattern because of the motion of the coupling region. For convenience of reference, one of the polarizations will be referred to as "slow"; and the other polarization will be referred to as "fast". The velocity of a light wave in a dielectric medium is the free space velocity of light divided by the refractive index of the dielectric; or $v = c/n$. Therefore, it may be seen that in a birefringent medium the polarization for which the refractive index is the greater is the slow wave; and the polarization for which the refractive index is smaller is the fast wave.

Referring to FIG. 19, the lines 320 represent a plane acoustic wavefront of wavelength $\lambda_a$ incident upon the fiber 302. Phase matching occurs when the component of the beat length $L_B$ in the direction of propagation of the acoustic wave equals the acoustic wavelength. Therefore, from FIG. 19 it is seen that $L_B \sin \theta = \lambda_a$. Using the well-known relation between wave velocity, frequency and wavelength to eliminate the acoustic wavelength from the preceding equation gives the acoustic frequency as $f = v/(L_B \sin \theta)$, where v is the acoustic wave velocity in the fiber 302.

The specific nature of the interaction of between the acoustic wave and the two optical polarizations propagated by the fiber 302 can be demonstrated using frequency-wave number diagrams. Referring to FIG. 21, if the acoustic wave travels in the same direction as the light in the fiber 302, light polarized in the fast mode and having frequency $\omega$ couples to the slow mode with the resulting wave having a frequency $\omega + \omega_a$, where $\omega_a$ is the acoustic wave frequency. Light propagating in the slow mode couples to the fast mode and shifts in frequency to $\omega - \omega_a$.

As shown in FIG. 20, if the acoustic wave propagates in a direction opposite to that of the light in the fiber, the frequency shifting characteristics of the system reverse. Specifically, light propagating in the fast mode couples to the slow mode with a change in frequency to $\omega - \omega_a$; and light propagating in the slow mode couples to the fast mode with a change in frequency to $\omega + \omega_a$.

Therefore, the frequency shifter 300 is a single side band frequency shifter if only light of a single polarization impinges upon the portion of the fiber 302 having the periodic moving stress pattern therein. In practice, the selected polarization may have small amounts of the carrier frequency and the sideband having the opposite frequency shift because of the finite extinction ratio of the polarizers include in the gyroscope 10 and other factors.

METHOD OF OPERATION

Having described the gyroscope system 10 and the various fiber optic components thereof, the method of operation of the fiber optic gyroscope 10 will be described in detail.

The clockwise optical wave passes through the phase modulator 30 at a time t, which causes a phase shift of $\Phi_m \sin \omega_m t$ where $\Phi_m$ and $\omega_m$ are the amplitude and frequency, respectively, of the signal output by the phase modulator 30. The linear polarizers 36 and 42 are of the orthogonal sense. For example, if the linear polarizer 36 propagates an x-polarized wave, then linear polarizer 42 propagates a y-polarized wave. Polarizer 42 and the polarization controller 46 convert the clockwise wave into a y-polarized wave with high efficiency due to the servo control of the polarization controller 46 by the control circuit 44, which uses error signal pickoffs from the polarizer 42 to adjust the polarization controller 46 to propagate the desired y-polarized wave. The frequency shifter 40 shifts the frequency of the clockwise wave from $f_o$ to $f_o + \Delta f$ and changes the polarization of the clockwise wave from y to x as described with reference to FIGS. 12 and 13. The polarization controller 34 converts the x-polarized clockwise wave into a state of polarization which is linear in the polarizer 22 under the action of the control circuit 38 and the error signal pickoff on the polarizer 36 to form an error signal for the control circuit 38 due to reciprocity. Clockwise wave next passes through the directional coupler 26, the polarizer 22 and the directional coupler 18 to produce a signal incident upon the photodetector 48. The total phase of the clockwise wave incident upon the photodetector 28 is given by $$\Phi_{cw} = \tfrac{1}{2}\Phi_s + \Phi_m \sin \omega_m t + 2\pi f_o T \tag{7}$$

where $f_o$ is the source frequency and T is the propagation time around the loop 28 and $\Phi_s$ is the Sagnac phase shift. The counterclockwise wave passes through the polarization controller 34 and becomes x-polarized with high efficiency due to the servo control of the polarization controller 34 by the control circuit 38, which uses an error signal pickoff from the polarizer 36 to produce a control signal for input to the polarization controller 34 to provide the desired x-polarized output. The frequency of the counterclockwise wave becomes $f_o + \Delta f$ after passage through the frequency shifter 40. The frequency shifter 40 also changes the polarization of the counterclockwise wave from x to y. The linear polarizer 42 and the polarization controller 46 convert the counterclockwise wave into a polarization state which becomes linear after the counterclockwise wave traverses the sensing loop and is incident upon the polarizer 22 due to reciprocity. The counterclockwise wave passes through the phase modulator at a time t+T where T is defined above. The counterclockwise wave undergoes a phase shift of $\Phi_m \sin \omega(t+T)$ in the phase modulator. The counterclockwise wave propagates through the directional coupler 26, the linear polarizer 22 and the directional coupler 18 to the photodetector 48. The total phase of the counterclockwise wave is $$\Phi_{ccw} = -\tfrac{1}{2}\Phi_s + \Phi_m \sin \omega_m(t+T) + 2\pi(f_o + \Delta f)T \tag{8}$$

where the variables have been previously defined. The photocurrent or electrical signal, S, from the detector 48, which is preferably a photodiode, with both the clockwise and counterclockwise waves being incident on it is $$S = \tfrac{1}{2}S_o(1 + \cos(\Phi_{cw} - \Phi_{ccw})) \tag{9}$$

where S is an amplitude constant.

By picking $\omega_m = \pi/T$, the signal of Equation (9) becomes $$S = \tfrac{1}{2}S_o(1 + \cos(\Phi_s + 2\pi\Delta f T + 2\Phi_m \sin \omega_m t)). \tag{10}$$

After coherent demodulation by the coherent demodulator 52 in phase with a reference signal of the form $\sin \omega_m t$ from the oscillator 50, which drives the phase modulator 30, the output of the demodulator 48 is $$S_\omega = S_o J_1(2\Phi_m) \sin(\Phi_s + 2\pi\Delta f T). \tag{11}$$

The loop electronics circuit 54 continually adjusts the output of the voltage controlled oscillator 56 which is related to f in such a manner as to have $S_\omega = 0$ for all $\Phi_s$. Therefore, $$\sin(\Phi_s + 2\pi\Delta f T) = 0, \tag{12}$$

which further gives the result that $$\Phi_s = -2\pi\Delta f T. \tag{13}$$

The Sagnac phase shift in terms of system parameters becomes $$2\pi L D \Omega/(\lambda c) = -2\pi\Delta f n L/c \tag{14}$$

and hence $\Omega = -\lambda n \Delta f / D$, where $\lambda$ is the free space source wavelength, n is the effective index of refraction of the guided mode and D is the diameter of the sensing loop 32, $\Omega$ is the input rotation rate of the sensing loop 32 and c is the free space velocity of light. Thus the output frequency of the voltage controlled oscillator 56 is linearly proportional to the rotation rate of the sensing loop 32. In addition, the gyrosystem 10 is rate integrating. Each cycle of the wave form of frequency $\Delta f$ output by the voltage controlled oscillator 56 equals a fixed angular increment in rotation of the sensing loop 32. The circuitry may be calibrated and include readout devices, such as the counter 55 and the display 57, that give the anular rotation rate and the angular displacement.

The foregoing analysis assumes that the frequency shifter 40 operates around DC. Referring to FIG. 23, if the frequency shifter 40 operates around an intermediate frequency, then the polarization controller 34, the polarizer 36, the frequency shifter 40, the polarizer 42 and the polarization controller 46 should be duplicated by a polarization controller 34A, a polarizer 36A, a frequency shifter 40A, a polarizer 42A and a polarization controller 46A between the phase modulator 30 and the sensing coil 32 so that the counter propagating waves traverse the same optical path. The distance from each frequency shifter to the directional coupler 26 must be identical to avoid bias drift in the gyro 10.

The essential operational features are that the clockwise and counterclockwise waves traverse identical optical paths, including the same polarization path, and that the frequency shift f is adjusted to null the phase difference between the clockwise and counterclockwise waves when they recombine in the directional coupler 26. The rate of rotation may then be determined by the amount of frequency shift required to achieve the desired null phase difference. The frequency shifter causes a frequency shift f in light passing therethrough that is a function of the frequency of the signal output by the voltage controlled oscillator 56. Therefore, all that is necessary for finding the rotation rate are the source wavelength, the effective index of refraction of the guided mode in the fiber 14, and the diameter of the sensing loop.

The optical fiber 14 is preferably a single mode fiber, having for example, an outer cladding diameter of about 80 microns and a core diameter of about 5 microns. The sensing loop 32 comprises a plurality of turns wrapped around a spool or other suitable support (not shown). In a preferred embodiment, the sensing loop 32 has approximately 2,800 turns of single mode fiber wound on a form having a diameter of about 7 centimeters.

The loop 32 is preferably wound with the central turns on the inside and the outer turns on the outside so that the winding is symmetrical in order to effectively cancel disturbances due to environmental changes such as varying temperature gradients and vibrations. In the preferred construction of the sensing loop 32, the fiber 14 is freely accessible at both ends of the sensing loop 32. The sensing loop may be wound by forming the fiber 14 into two supply rolls, each of which comprises approximately half of the length of the fiber 14. Starting at the center, the fiber 14 is wound from the two rolls onto the spool or form in opposite directions to form the sensing loop 32. As the winding builds up on the spool, the ends of the fiber 14 are always outside the coil.

The amplitude of the output wave emanating from port 1 of the directional coupler 26 is indicative of the phase difference between the counter propagating waves. To eliminate undesired phase shifts other than those due to rotation of the loop, it is important to detect only those portions of the counter propagating waves which travel the same optical path, thereby insuring that slow changes in the optical paths due to environmental conditions such as temperature fluctuations, will effect the phases of both the clockwise and counterclockwise wave equally. The portions of the counter propagating waves that exit the polarizer 22 through port 1 have traveled the same optical path, and the polarization controller 34, polarizer 36, control circuit 38, polarization controller 46, polarizer 42 and control circuit 44 insure that waves input to and output from the sensing loop 32 have a single state of polarization.

The phase modulator 30 modulates the phases of the counter propagating waves to bias the output signal and improve the sensitivity of the gyrosystem 10 and to provide an indication of the direction of rotation of the sensing loop 32. The phase modulator 30 may typically comprise a piezoelectric transducer (not shown) that modulates the length or refractive index of the fiber 14 in a known manner. The oscillator 50 provides a modulating signal at a suitable voltage level and frequency, for example, a voltage of 12 volts RMS and a frequency of 126 KHz. The amplitude of the phase modulation is identical for the two counter propagating waves, but a relative phase difference is produced between the two waves due to its propagation time through the sensing loop 32.

In the illustrated embodiment, all of the fiber optic components are formed using the fiber 14, which extends continuously throughout the system. The fiber optic components could be formed separately and spliced together by bonding with an ultraviolet setting adhesive, as is well known in the fiber optic arts. Fiber splicing devices (not shown) currently available, permit optical fibers to be spliced together with approximately a 1% energy loss at the splice. However, the fiber 14 is preferably an uninterrupted strand in order to eliminate noise due to reflections and scattering at the splices.

What is claimed is:

1. A fiber optic rotation sensor, comprising:
   a length of optical fiber including a sensing coil formed therein;
   means for introducing a pair of counterpropagating light waves into said sensing coil such that rotation of said sensing coil causes a phase shift between the counterpropagating light waves, said phase shift being indicative of the rotation rate of said sensing coil;
   fiber optic frequency shifting means formed to interact with said length of optical fiber for producing a frequency shift in each of said counterpropagating waves to compensate for phase shifts caused by rotation of said sensing coil;
   means for producing a frequency shift signal indicative of the frequency shift produced by said fiber optic frequency shifting means to indicate the rotation rate of said sensing coil, the frequency shift signal being an oscillatory signal having a frequency indicative of the rotation rate of the sensing coil, each oscillation of the frequency shift signal being indicative of a predetermined incremental angular displacement of said sensing coil; and
   a phase modulator formed in said optical fiber for modulating the phase of a first one of said counterpropagating waves before said first wave impinges upon said sensing coil and for modulating the phase of the second wave after said second wave has propagated through said sensing coil.

2. The fiber optic rotation sensor of claim 1 further including means for maintaining said counterpropagating waves in identical optical paths.

3. The fiber optic rotation sensor of claim 2 further including means for maintaining said counterpropagating waves in constant polarization states at the output of said length of optical fiber.

4. The fiber optic rotation sensor of claim 3 including counter means for sensing the amount of frequency shift of said counterpropagating waves to produce a counter signal indicative of the rotation rate of said sensing coil.

5. The fiber optic rotation sensor of claim 3 further comprising detector means for producing a detector signal indicative of the phase difference between said counterpropagating waves, said fiber optic frequency shifting means adjusting the frequency of the counterpropagating waves to minimize said detector signal.

6. The fiber optic rotation sensor of claim 3 wherein said fiber optic frequency shifting means comprises;
   a first frequency shifter formed in said length of optical fiber for shifting the frequency of a first one of said pair of counterpropagating waves after said first one of said counterpropagating waves has traversed said sensing coil; and
   a second frequency shifter formed in said length of optical fiber for shifting the frequency of a second one of said pair of counterpropagating waves after said second one of said counterpropagating waves has traversed said sensing coil.

7. The fiber optic rotation sensor of claim 6, further including:
   first oscillator means for controlling the amount of frequency shift produced by said first frequency shifter; and
   second oscillator means for controlling the amount of frequency shift produced by said second frequency shifter.

8. The fiber optic rotation sensor of claim 7 further including counter means for sensing the amounts of frequency shifts produced by said first and second frequency shifters to produce a counter signal indicative of the rotation rate of said sensing coil.

9. The fiber optic rotation sensor of claim 5 wherein said detector means includes:
   a coherent demodulator for demodulating the detector signal with a reference signal to produce an error signal;
   means for processing the error signal to produce a control signal; and
   means responsive to the control signal for providing a driving signal to said frequency shifter to maintain the error signal below a predetermined threshold.

10. The fiber optic rotation sensor of claim 9 wherein said driving signal is an oscillatory signal having a frequency indicative of the frequency shift imposed upon said counterpropagating waves by said frequency shifter.

11. The fiber optic rotation sensor of claim 10 further including means for determining the frequency of said driving signal to determine the rotation rate of said sensing coil.

12. The rotation sensor of claim 10 further including means for processing said driving signal to determine both the rotation rate and angular displacement of said sensing coil.

13. A fiber optic rotation sensor, comprising:
a length of optical fiber formed to have a sensing coil therein;
means for providing low coherence light of a first predetermined polarization state and a second predetermined polarization state for input to said sensing coil, said first and second predetermined polarization states being orthogonal;
a fiber optic directional coupler formed in said optical fiber for receiving said optical signal and forming a clockwise wave and a counterclockwise wave in said sensing coil, said optical fiber being formed to have a first portion extending between said directional coupler and said sensing coil and a second portion extending between said directional coupler and said sensing coil;
a phase modulator formed in said first portion for modulating the phase of one of said counterpropagating waves before input to said sensing coil and for modulating the phase of the other of said counterpropagating waves after it has traversed said sensing coils;
first means for maintaining the first signal in the first predetermined polarization state;
second means for maintaining said second signal in said second predetermined polarization state;
a frequency shifter formed in the optical fiber between said first and second polarization maintaining means, said frequency shifter producing a change in the frequency of said counterpropagating waves to compensate for the change in phase induced by rotation of said sensing coil;
means for detecting the recombined signals output from said directional coupler to produce a signal indicative of the phase difference between said first and second signals;
demodulator means for processing the output of said detector means to produce an error signal;
means for processing the error signal to produce a control signal;
means responsive to the control signal for providing a driving signal to said frequency shifter to maintain said error signal below a predetermined threshold; and
means for processing said control signal to determine the rotation rate of said sensing coil.

14. The rotation sensor of claim 13 wherein said control signal is an oscillatory signal having a frequency that is indicative of the rotation rate of said sensing coil and wherein each oscillation of said control signal corresponds to an incremental change in the angular position of said sensing coil.

15. The fiber optic rotation sensor of claim 13 further comprising:
a first frequency shifter formed in said length of optical fiber for shifting the frequency of a first one of said pair of counterpropagating waves after said first one of said counterpropagating waves has traversed said sensing coil; and
a second frequency shifter formed in said length of optical fiber for shifting the frequency of a second one of said pair of counterpropagating waves after said one of said counterpropagating waves has traversed said sensing coil, said first and second frequency shifters being symmetrically positioned in said length of optical fiber with respect to said sensing coil.

16. A method for sensing rotations, comprising the steps of:
forming a sensing coil in a length of optical fiber;
introducing a pair of counterpropagating light waves into said sensing coil such that rotation of said sensing coil causes a phase shift between the counterpropagating light waves, said phase shift being indicative of the rotation rate of said sensing coil;
forming fiber optic frequency shifting means to interact with said length of optical fiber to produce a frequency shift in each of said counterpropagating waves to compensate for phase shifts caused by rotation of said sensing coil;
producing a frequency shift signal indicative of the phase change produced by said fiber optic frequency shifting means to indicate the rotation of said sensing coil and to compensate for phase shifts caused by rotation of said sensing coil, the frequency shift signal being an oscillatory signal having a frequency indicative of the rotation rate of said angular displacement of the sensing coil, each oscillation of the frequency shift signal being indicative of a predetermined incremental angular displacement of said sensing coil; and
forming a phase modulator in said optical fiber for modulating the phase of a first one of said counterpropagating waves before said first wave impinges upon said sensing coil and for modulating the phase of the second wave after said second wave has propagated through said sensing coil.

* * * * *